United States Patent
Soga et al.

(10) Patent No.: US 9,503,960 B2
(45) Date of Patent: Nov. 22, 2016

(54) RADIO COMMUNICATION APPARATUS AND RADIO COMMUNICATION METHOD

(71) Applicant: Panasonic Corporation, Osaka (JP)

(72) Inventors: Shigeru Soga, Hyogo (JP); Ippei Kanno, Kyoto (JP); Yoshinobu Matsumura, Osaka (JP); Hisateru Kobatake, Osaka (JP); Teruaki Hasegawa, Osaka (JP)

(73) Assignee: Panasonic Corporation, Osaka (JP)

( * ) Notice: Subject to any disclaimer, the term of this patent is extended or adjusted under 35 U.S.C. 154(b) by 226 days.

(21) Appl. No.: 14/571,343

(22) Filed: Dec. 16, 2014

(65) Prior Publication Data

US 2015/0181501 A1 Jun. 25, 2015

(30) Foreign Application Priority Data

Dec. 25, 2013 (JP) .................................. 2013-267117

(51) Int. Cl.
*H04W 40/16* (2009.01)
*H04L 27/00* (2006.01)
*H04B 17/345* (2015.01)
*H04J 11/00* (2006.01)
*H04L 5/00* (2006.01)
*H04L 27/26* (2006.01)

(52) U.S. Cl.
CPC ........... *H04W 40/16* (2013.01); *H04B 17/345* (2015.01); *H04J 11/0036* (2013.01); *H04L 5/0062* (2013.01); *H04L 5/0098* (2013.01); *H04L 27/0012* (2013.01); *H04L 27/2647* (2013.01); *H04L 5/0048* (2013.01); *H04L 27/2613* (2013.01)

(58) Field of Classification Search
CPC ......... H04L 27/2647; H04L 25/0328; H04W 56/0035; H04W 40/16; H04W 24/08; H04J 11/0036; H04B 17/345
See application file for complete search history.

(56) References Cited

U.S. PATENT DOCUMENTS

2006/0171445 A1* 8/2006 Batra .................... H04B 1/719
375/130

(Continued)

FOREIGN PATENT DOCUMENTS

JP 2008-199102 8/2008

*Primary Examiner* — Samina Choudhry
*Assistant Examiner* — Peter Chen
(74) *Attorney, Agent, or Firm* — Seed IP Law Group LLP

(57) ABSTRACT

An interfering wave is detected using, in a received signal including a preamble and a control signal field, a plurality of symbols including a symbol configuring the preamble and a symbol configuring the control signal field. The received signal has one of a plurality of transmission formats that use at least either a first frequency band or a second frequency band. In a signal quality detector, a symbol differential calculator calculates, in each of the first frequency band and the second frequency band, differences between a certain number of symbols adjacent to one another at predetermined positions in a time domain among the plurality of symbols. A square operator performs square operations on results of the calculation of differences. An interference determiner determines, using results of the square operations, whether each of the first frequency band and the second frequency band includes an interfering wave.

12 Claims, 16 Drawing Sheets

(56) References Cited

U.S. PATENT DOCUMENTS

| | | | |
|---|---|---|---|
| 2007/0223393 A1* | 9/2007 | Urushihara | H04B 1/715 370/252 |
| 2008/0192644 A1 | 8/2008 | Utsunomiya et al. | |
| 2011/0103431 A1* | 5/2011 | Narasimha | H04B 1/525 375/148 |
| 2013/0107830 A1 | 5/2013 | Jones, IV et al. | |

* cited by examiner

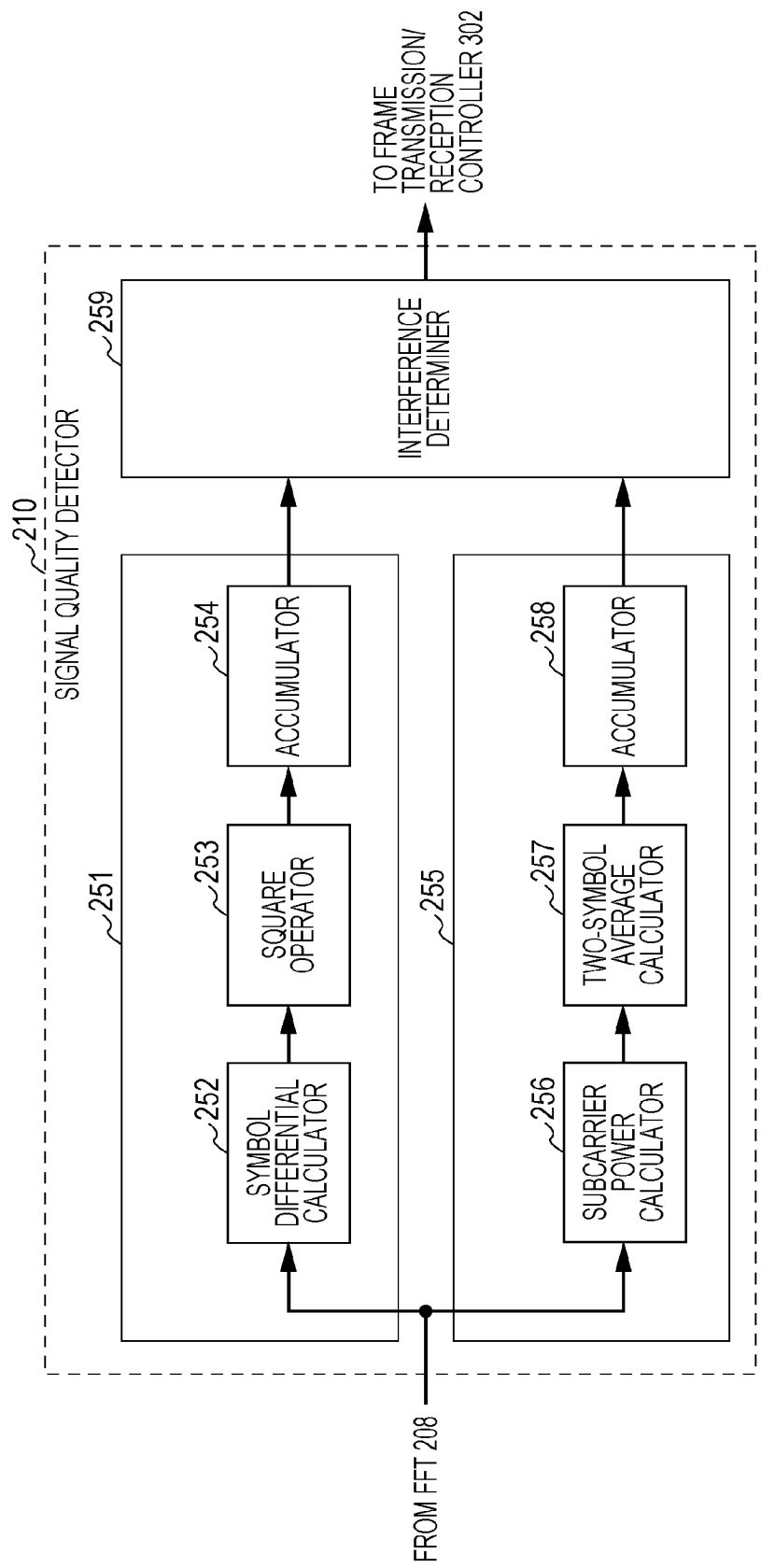

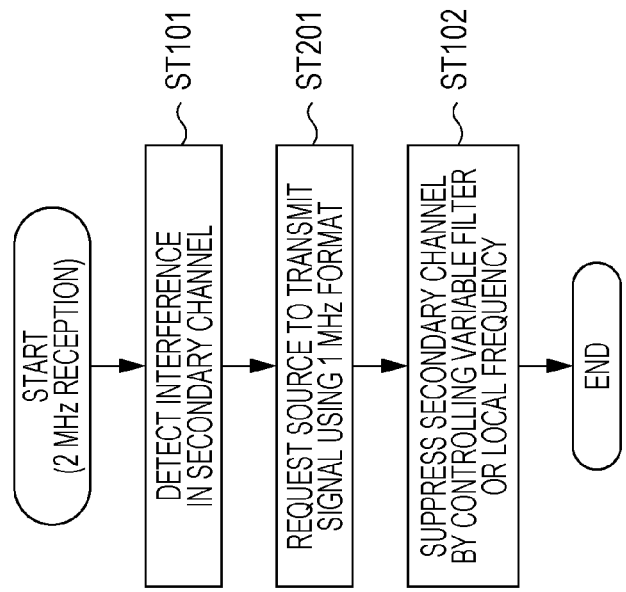
FIG. 11A
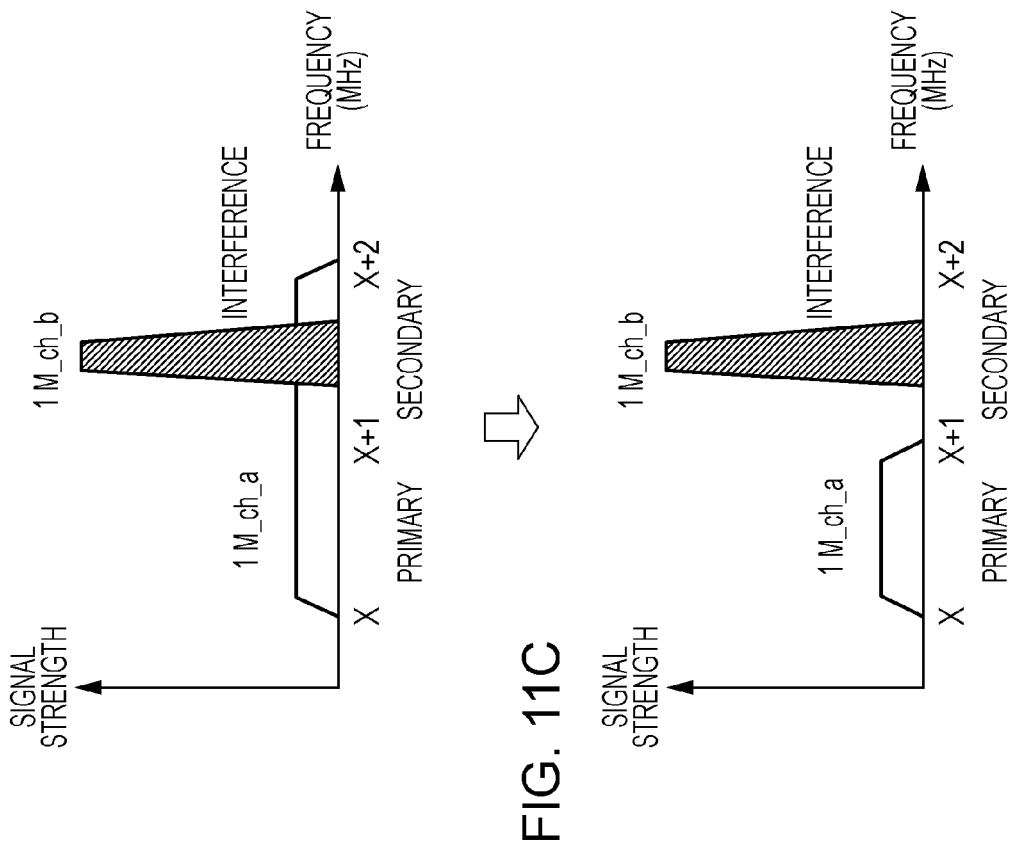
FIG. 11B
FIG. 11C

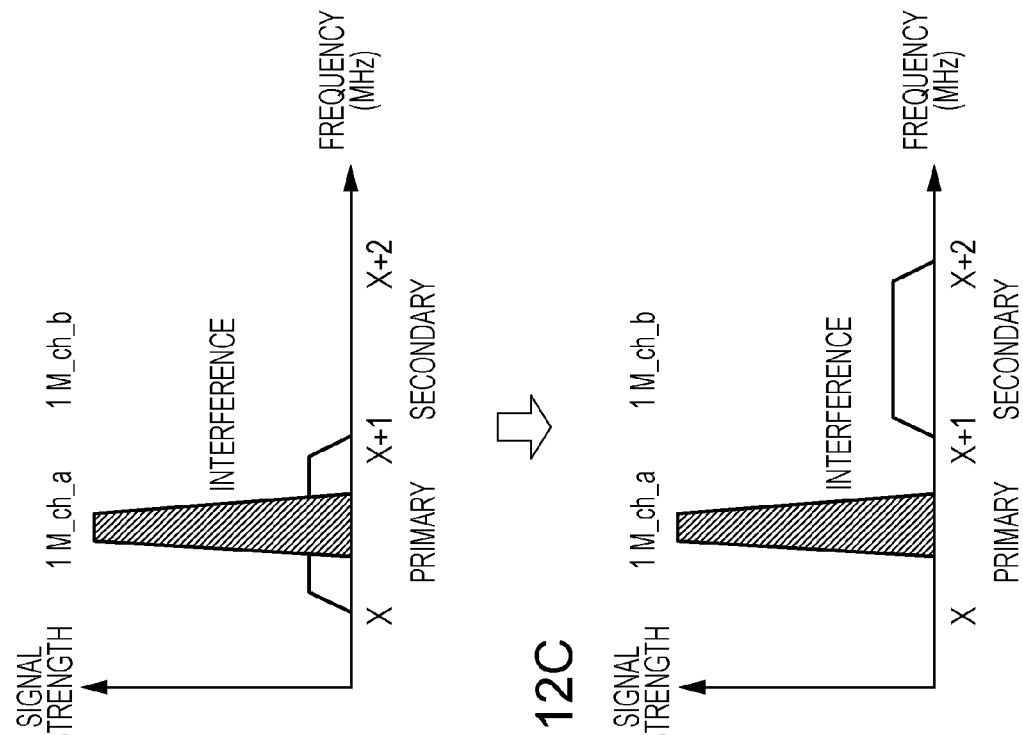
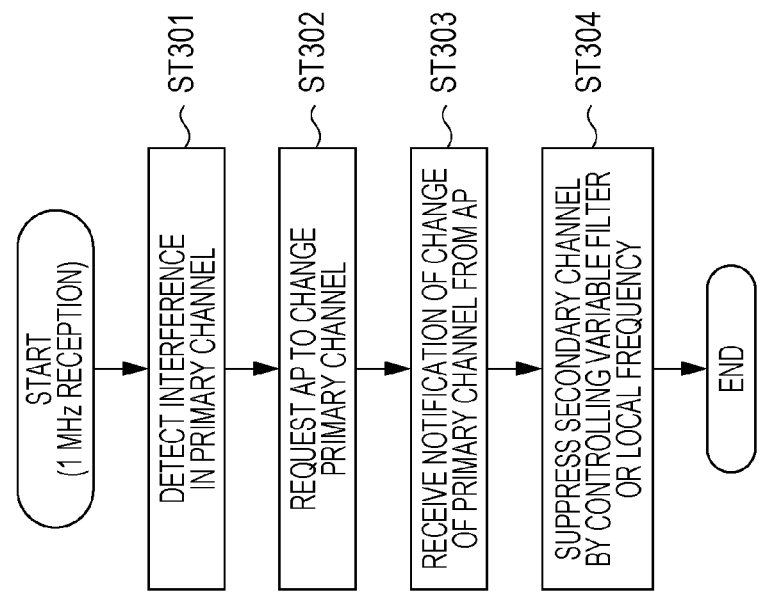

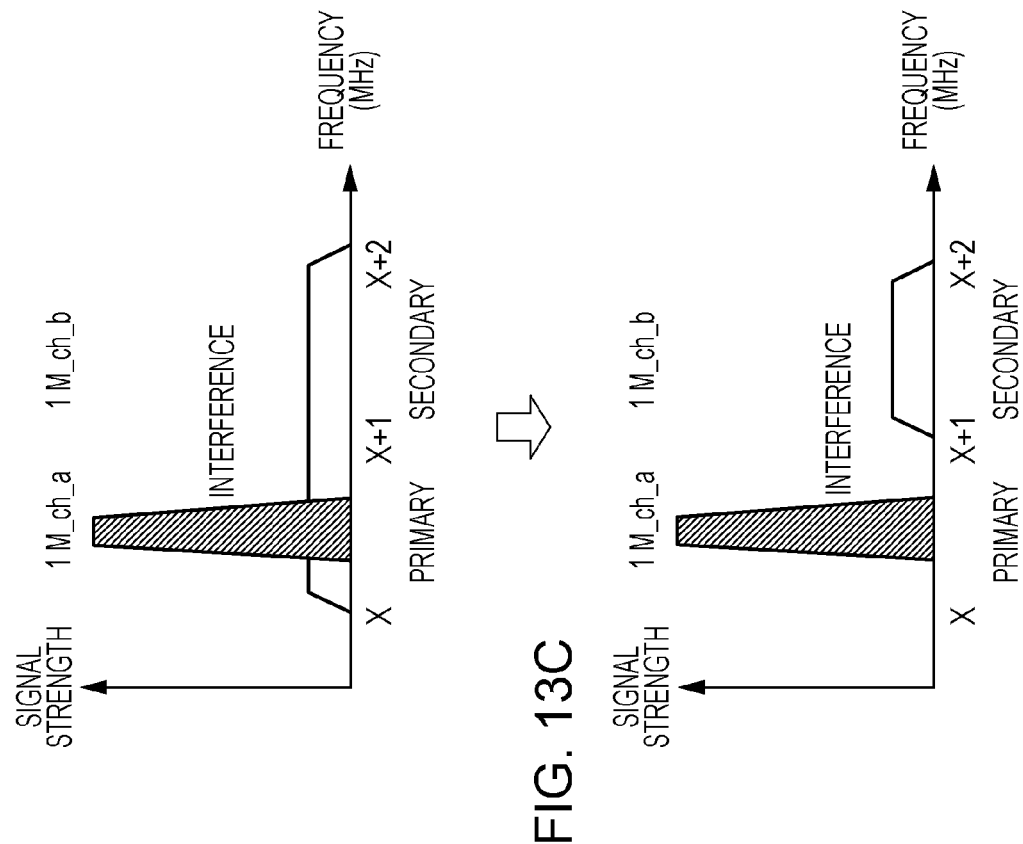
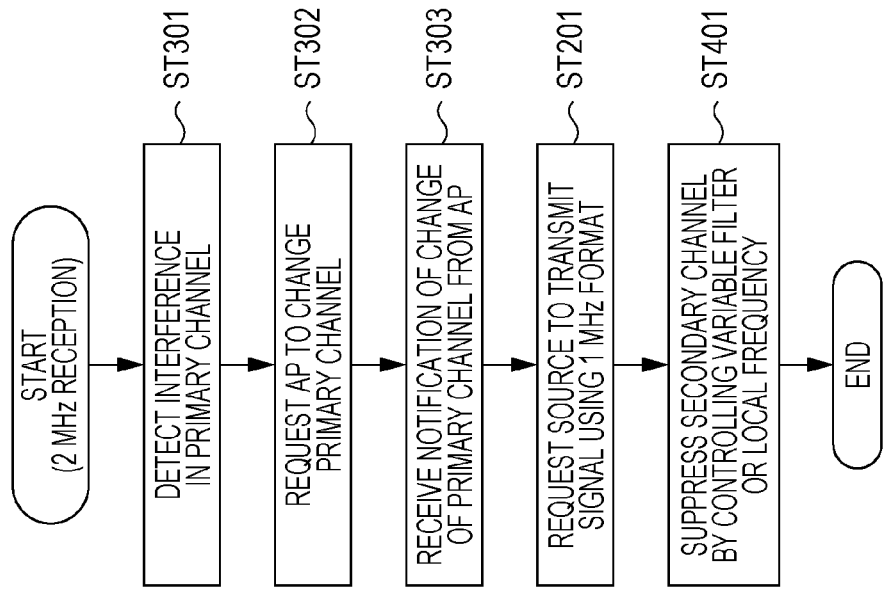

RADIO COMMUNICATION APPARATUS AND RADIO COMMUNICATION METHOD

The present application is based on and claims the benefit of Japanese Patent Application No. 2013-267117 filed in the Japan Patent Office on Dec. 25, 2013, the entire contents of which are incorporated herein by reference.

BACKGROUND

1. Technical Field

The present disclosure relates to a radio communication apparatus and a radio communication method that detect interference in an interfering wave environment and that improve a decrease in throughput in communication based on an Institute of Electrical and Electronics Engineers (IEEE) 802.11ah standard, in which an orthogonal frequency-division multiplexing (OFDM) scheme is used.

2. Description of the Related Art

So far, a main target of IEEE 802.11 wireless local area network (LAN) standards has been indoor communication. As standards in a physical layer, standards that are mainly aimed at increasing transmission capacity, such as 802.11b (a maximum of 11 Mbps), 802.11a and 11 g (a maximum of 54 Mbps), 802.11n (a maximum of 600 Mbps), and 802.11ac (a maximum of 6.9 Gbps), have been added. On the other hand, as comprehensive examination of smart meters for realizing smart grids begins, there is an increased need for low-rate, long-distance outdoor transmission. Discussions on assignment of frequencies for specified low-power radio communication intended for such use are also continuing. For these reasons, establishment of new communication standards that use a sub-gigahertz band (a frequency band slightly lower than 1 GHz) is now being examined. In IEEE 802.11, too, Task Group ah (TGah; 802.11ah) for examining a wireless LAN standard that uses a frequency band lower than 1 GHz was found in 2010. One of main requirements specifications in TGah (802.11ah) is to realize "a data rate of 100 kbps or higher and a maximum transmission distance of 1 km".

In IEEE 802.11a and later standards that use an orthogonal frequency-division multiplexing (OFDM) modulation scheme, including TGah (802.11ah), burst transmission is performed after various types of synchronization are established using a preamble at a top of a packet. A preamble includes a short training field (STF; also referred to as a "short preamble") and a long training field (LTF; also referred to as a "long preamble"). The STF is used for automatic gain control (AGC) or automatic frequency control (AFC) for coarse adjustment. The LTF is used for AFC for fine adjustment or estimation of channel characteristics. After the preamble, signal information for controlling a data field (also referred to as "DATA") is provided. The signal information is multiplexed by binary phase-shift keying (BPSK) modulation, which is not easily affected by interference.

It is suggested that in TGah (802.11ah), as in the 802.11n standard, in which a 20 MHz channel or a 40 MHz channel can be used, a 1 MHz channel or a 2 MHz channel be used.

For example, it is disclosed in Japanese Patent No. 4413934 that, in IEEE 802.11n, 40 MHz transmission is realized by simultaneously using two adjacent channels, each having a bandwidth of 20 MHz. One of the two channels is called a "primary channel" and used for performing 20 MHz transmission or sharing control information for managing a basic service set (BSS). The other channel is called a "secondary channel" and used as a channel for expanding the band for the 40 MHz transmission.

Here, it is disclosed in Japanese Patent No. 4413934 that if the amount of interference from another system or a wireless LAN included in the secondary channel is large, frames are transmitted using not a 40 MHz bandwidth but the primary channel having a bandwidth of 20 MHz. As a result, more frames are transmitted and received successfully, thereby improving throughput characteristics. The amount of interference is obtained from frame error rates in 40 MHz reception and 20 MHz reception and the reception power of the primary channel and the secondary channel.

In addition, in U.S. Patent Application Publication No. 2013/0107830, a method for determining the primary channel of a new BSS in 802.11ah in the following manner in consideration of overlap between BSSs in an environment in which a 1 MHz channel or a 2 MHz channel can be used is disclosed. That is, the primary channel is determined through channel scanning performed by an access point (AP) or communication with an AP of an existing BSS. In U.S. Patent Application Publication No. 2013/0107830, the primary channel of a new BSS is determined such that the primary channel does not become the same as the secondary channel of an existing BSS. Thus, by notifying all apparatuses of the primary channel of a new BSS before the establishment of the new BSS, a decrease in throughput in an overlap environment can be suppressed.

SUMMARY

In the method in an example of the related art, namely Japanese Patent No. 4413934, in which the amount of interference is calculated from the frame error rates and the reception power, it is difficult to distinguish an interfering wave and a desired wave, thereby making it also difficult to accurately calculate the amount of interference. Therefore, for example, unnecessary switching of the channel might occur, which can decrease throughput characteristics.

Furthermore, since a maximum transmission distance of 1 km, which is larger than in existing standards, is prepared in 802.11ah, it is desired that interference be accurately detected even under weak field conditions. In addition, in 802.11ah, four different formats, namely a 1 MHz format, a 1 MHz duplicate format, a 2 MHz short format, and a 2 MHz long format, are used in 1 MHz or 2 MHz bandwidth communication. Therefore, a method for detecting interference regardless of the format is also desired.

Thus, a non-limiting exemplary embodiment of the present disclosure provides a radio communication apparatus and a radio communication method capable of accurately detecting an interfering wave regardless of the transmission format.

A radio communication apparatus according to an aspect of the present disclosure includes a detector that detects an interfering wave using a plurality of symbols including symbols configuring a preamble and symbols configuring a control signal field, within a received signal including the preamble on which pilot signals are multiplexed and the control signal field on which a control signal modulated by a modulation scheme that uses a same phase as or a phase in quadrature with a phase of the pilot signals is arranged, the received signal having one of a plurality of transmission formats that use at least one of a first frequency band and a second frequency band, and a controller that, if the interfering wave is detected, suppresses an effect of the interfering wave upon the received signal. The detector includes a differential calculator that calculates, in each of the first frequency band and the second frequency band, respective differences between adjacent two symbols of a certain number of symbols at predetermined positions in a time domain among the plurality of symbols, a square operator that performs square operations on results of the calculation of differences, and a determiner that determines, using results of the square operations, whether the interfering wave is detected in each of the first frequency band and the second frequency band.

These general and specific aspects may be implemented using a system, a method, and a computer program, and any combination of systems, methods, and computer programs.

According to the present disclosure, an interfering wave can be accurately detected regardless of the transmission format. Additional benefits and advantages of the disclosed embodiments will be apparent from the specification and Figures. The benefits and/or advantages may be individually provided by the various embodiments and features of the specification and Figures, and need not all be provided in order to obtain one or more of the same.

BRIEF DESCRIPTION OF THE DRAWINGS

FIG. 7 is a block diagram illustrating the internal configuration of a signal quality detector according to the first embodiment of the present disclosure.

FIG. 11A is a flowchart illustrating a process for suppressing an interfering wave in a second operation example of the first embodiment of the present disclosure.

FIG. 11B is a diagram illustrating waveforms of a signal having a bandwidth of 2 MHz and an interfering wave in the second operation example of the first embodiment of the present disclosure.

FIG. 11C is a diagram illustrating waveforms of a signal having a bandwidth of 1 MHz and the interfering wave in the second operation example of the first embodiment of the present disclosure.

FIG. 12A is a flowchart illustrating a process for suppressing an interfering wave in a third operation example of the first embodiment of the present disclosure.

FIGS. 12B and 12C are diagrams illustrating waveforms of a signal having a bandwidth of 1 MHz and an interfering wave in the third operation example of the first embodiment of the present disclosure.

FIG. 13A is a flowchart illustrating a process for suppressing an interfering wave in a fourth operation example of the first embodiment of the present disclosure.

FIG. 13B is a diagram illustrating an example of waveforms of a signal having a bandwidth of 2 MHz and an interfering wave in the fourth operation example of the first embodiment of the present disclosure.

FIG. 13C is a diagram illustrating an example of waveforms of a signal having a bandwidth of 1 MHz and the interfering wave in the fourth operation example of the first embodiment of the present disclosure.

DETAILED DESCRIPTION

Embodiments of the present disclosure will be described in detail hereinafter with reference to the drawings.

Outline of Radio Communication System

Figure 1:
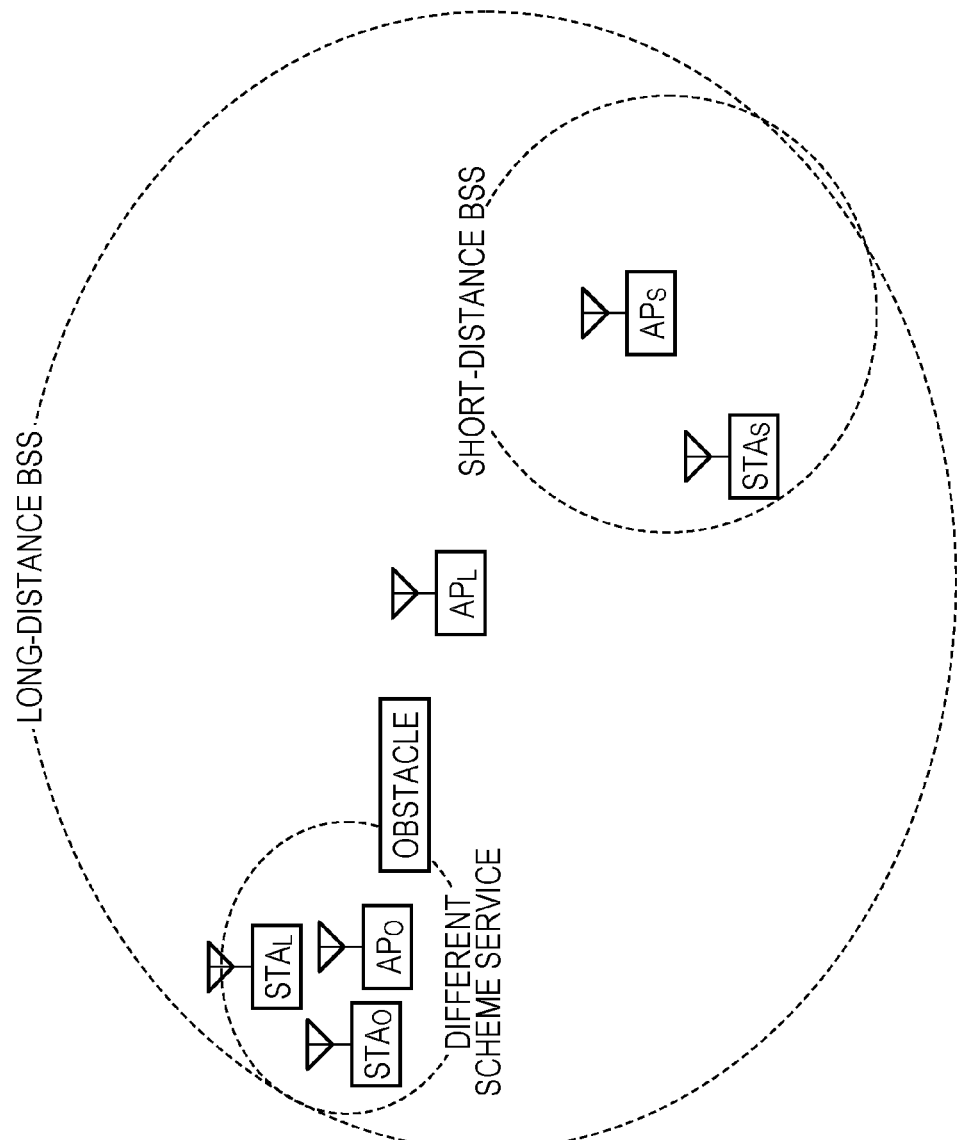
FIG. 1 is a diagram illustrating an example of the configuration of a radio communication system according to each embodiment of the present disclosure.

FIG. 1 is a diagram illustrating an example of the configuration of a radio communication system according to each embodiment of the present disclosure. In the radio communication system illustrated in FIG. 1, for example, a "long-distance BSS", in which transmission distances are relatively large, according to an 802.11ah standard is configured by connecting an access point $AP_L$ and a radio terminal $STA_L$.

In addition, in the radio communication system illustrated in FIG. 1, a "short-distance BSS", in which transmission distances are relatively small, according to the 802.11ah standard is configured by connecting an access point $AP_S$ and a radio terminal $STA_S$. The short-distance BSS overlaps the long-distance BSS.

In addition, in the radio communication system illustrated in FIG. 1, a scheme service different from a communication scheme used in the short-distance BSS and the long-distance BSS is configured by connecting an access point $AP_O$ and a radio terminal $STA_O$. This different scheme service is configured near the radio terminal $STA_L$. That is, the different scheme service is located sufficiently close to the radio terminal $STA_L$ relative to the access point $AP_L$.

The access point $AP_L$ controls the long-distance BSS, the access point $AP_S$ controls the short-distance BSS, and the access point $AP_O$ controls the different scheme service in a centralized manner.

In FIG. 1, the access points $AP_S$ and $AP_L$ of the BSSs identify available channels through channel scanning or communication between the APs and determine the channels to be used by the corresponding STAs. In FIG. 1, there is an obstacle between the access point $AP_L$ of the long-distance BSS and the different scheme service (the access point $AP_O$ and the radio terminal $STA_O$). Therefore, it is difficult for the access point $AP_L$ to detect a signal used in the different scheme service through the channel scanning. In FIG. 1, the transmission distance between the radio station $STA_L$ and the different scheme service (the radio terminal $STA_O$ and the access point $AP_O$) is considerably smaller than the transmission distance between the radio station $STA_L$ and the access point $AP_L$. Therefore, it is assumed that in the radio terminal $STA_L$, the reception field strength of a signal (interfering wave) from the different scheme service is considerably higher than the reception field strength of a signal (desired wave) from the access point $AP_L$. That is, the apparatuses (the access point $AP_O$ and the radio terminal $STA_O$) of the different scheme service are "hidden terminals" to the access point $AP_L$.

Communication Channels

In a BBS according to the 802.11ah standard, frame packets are transmitted and received using two types of channels having different frequency bandwidths. More specifically, a first channel having a communication bandwidth of 1 MHz and a second channel having a communication bandwidth of 2 MHz are used.

Figure 2A:
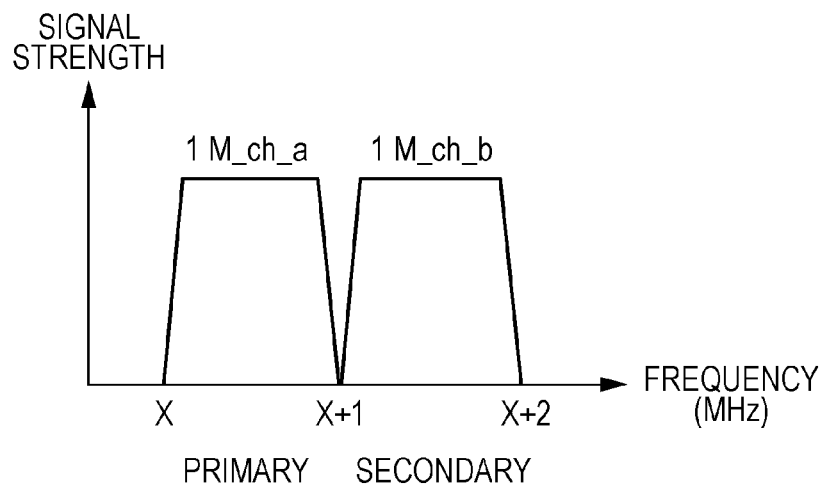
FIG. 2A is a diagram illustrating an example of channels used in 802.11ah, each having a communication bandwidth of 1 MHz.
Figure 2B:
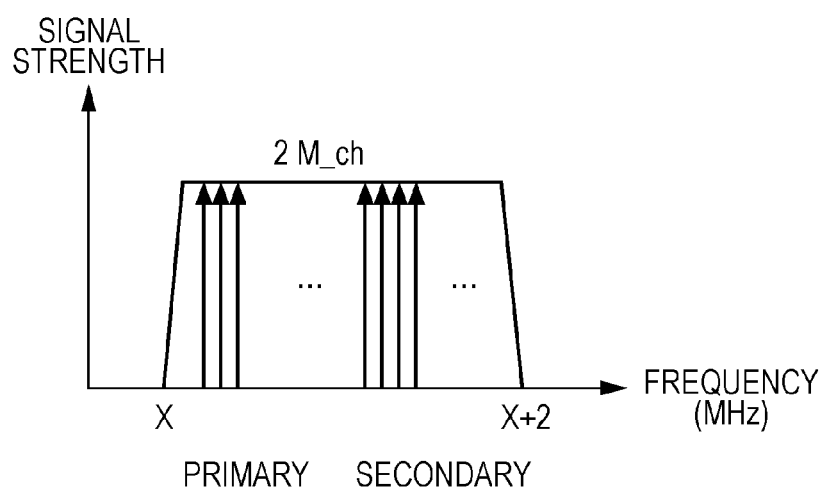
FIG. 2B is a diagram illustrating an example of a channel having a communication bandwidth of 2 MHz used in 802.11ah.

FIGS. 2A and 2B illustrate channels used in the 802.11ah standard. A channel 1M_ch_a illustrated in FIG. 2A is a channel having a communication bandwidth of 1 MHz ranging over a frequency band of X [MHz] to X+1 [MHz]. A channel 2M_ch illustrated in FIG. 2B is a channel having a communication bandwidth of 2 MHz ranging over a frequency band of X [MHz] to X+2 [MHz].

Therefore, the frequency band of X [MHz] to X+1 [MHz] is used by both the channel 1M_ch_a, which has a communication bandwidth of 1 MHz, and the channel 2M_ch, which has a communication bandwidth of 2 MHz. A frequency band used by a plurality of the channels will be referred to as a "primary channel".

Another channel 1M_ch_b illustrated in FIG. 2A is a channel having a communication bandwidth of 1 MHz ranging over a frequency band of X+1 [MHz] to X+2 [MHz]. The channel 1M_ch_b configures a channel having a communication bandwidth of 2 MHz along with the channel 1M_ch_a. The channel 1M_ch_b will be referred to as a "secondary channel". The secondary channel is not independently used in 1 MHz communication of the BSS, but can be used in another system. Transmission formats that use the secondary channel include a 1 MHz duplicate format, a 2 MHz short format, and a 2 MHz long format, which will be described later.

Each channel is configured by OFDM signals, which are used as one of multicarrier schemes, that use pilot carriers in which a predetermined phase and amplitude are multiplexed or data carriers in which data subjected to BPSK or quadrature phase-shift keying (QPSK) modulation is multiplexed. Carrier spacing is the same between a case in which the communication bandwidth of 1 MHz is used (1 MHz format) and a case in which the communication bandwidth of 2 MHz is used (2 MHz format).

Transmission Formats

Figure 3:
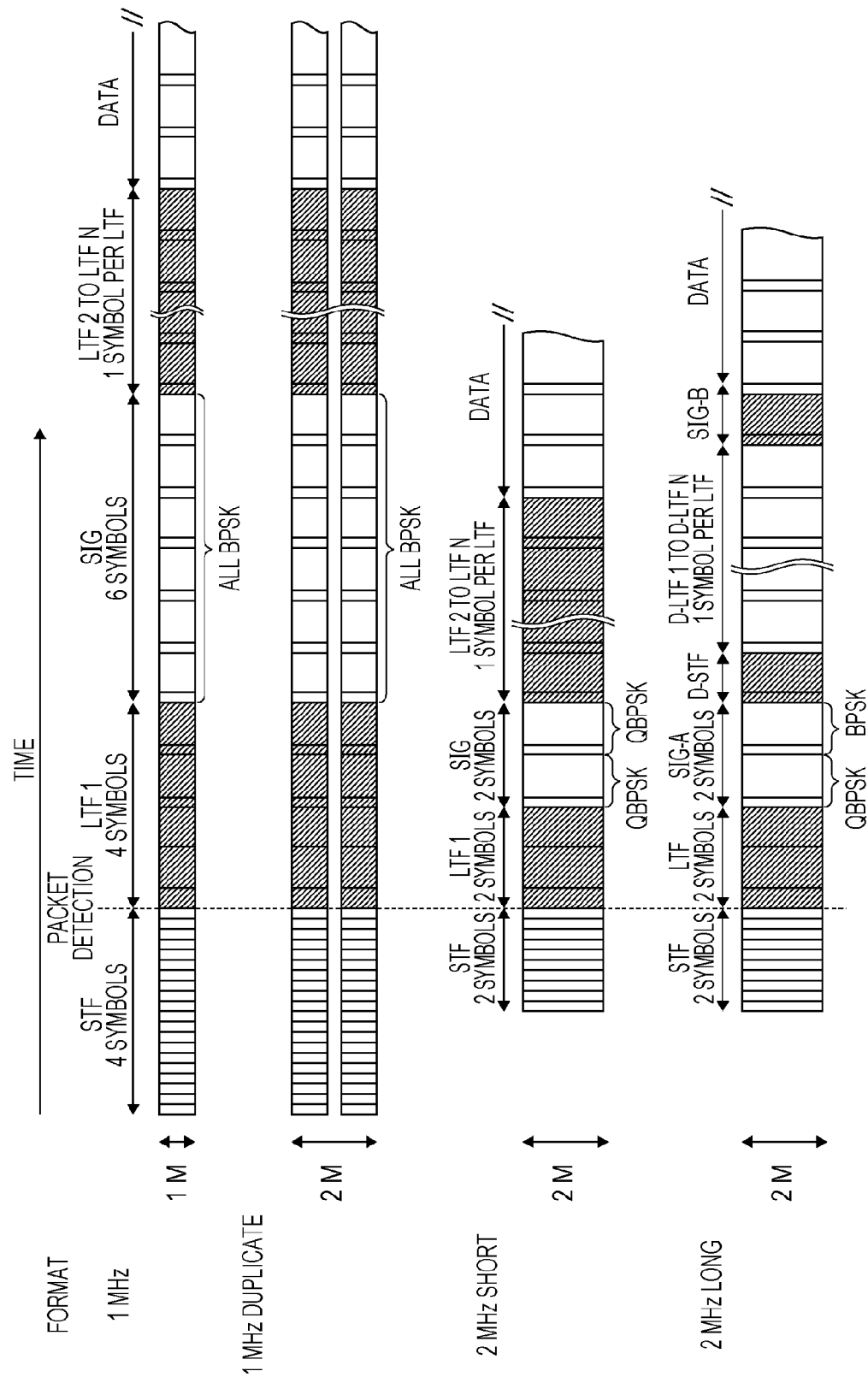
FIG. 3 is a diagram illustrating an example of transmission formats used in 802.11ah.

FIG. 3 is a timing chart of transmission formats used in 802.11ah. In FIG. 3, the horizontal axis represents a time domain, and the vertical axis represents a frequency domain.

There are roughly four transmission formats, namely a 1 MHz format, a 1 MHz duplicate format (also referred to as a duplicate mode), a 2 MHz short format, and a 2 MHz long format.

As illustrated in FIG. 3, each transmission format is configured by performing time-division multiplexing on a preamble (an STF and LTFs), a signal field (SIG), and a data field (DATA). The preamble (the STF and the LTFs) is configured by pilot signals. In the signal field (SIG), control information (signal information) regarding the data field is multiplexed. In the data field (DATA), data is multiplexed.

More specifically, the 1 MHz format uses a 1 MHz bandwidth (that is, the primary channel) and includes an STF, an LTF 1, a SIG, LTFs 2 to N, and a DATA. The STF, the LTF 1, and the SIG include four symbols, four symbols, and six symbols, respectively. The four symbols in the LTF 1 will also be referred to as long training symbols (LTSs) 1 to 4.

In the 1 MHz duplicate format, a 2 MHz bandwidth (that is, the primary channel and the secondary channel) obtained by multiplexing the same frame packet (a signal having a bandwidth of 1 MHz) as that in the primary channel on the secondary channel is used.

In the 2 MHz short format, a 2 MHz bandwidth (that is, the primary channel and the secondary channel) is used. The 2 MHz short format includes an STF, an LTF 1, a SIG, LTFs 2 to N, and a DATA. The STF, the LTF 1, and the SIG each include two symbols, and the LTFs 2 to N each include one symbol. In the following description, the two symbols of the LTF 1 will also be referred to as LTSs 1 and 2, and the two symbols of the SIG will also be referred to as SIGs 1 and 2.

In the 2 MHz long format, a 2 MHz bandwidth (that is, the primary channel and the secondary channel) is used. The 2 MHz long format includes an STF, an LTF, a SIG-A, a D-STF, D-LTFs 1 to N, a SIG-B, and a DATA. Each of the STF, the LTF, and the SIG-A includes two symbols, and each of the D-STF, the D-LTFs 1 to N, and the SIG-B includes one symbol. In the following description, the two symbols of the LTF will also be referred to as LTSs 1 and 2, and the two symbols of the SIG-A will also be referred to as SIG-As 1 and 2.

That is, in 802.11ah, a plurality of transmission formats including a transmission format that uses a band of 1 MHz (the primary channel) and a transmission format that uses the primary channel and another band of 1 MHz (the secondary channel) are used.

In each transmission format, the STF is used for AGC, AFC for coarse adjustment, or detection of a packet. That is, the timing chart of FIG. 3 illustrates a relationship between the formats in terms of relative time at a time when a packet is detected using the STF.

The LTFs are used for AFC and estimation of channels. In the LTFs, the phase of a pilot signal in each subcarrier is determined as 0 degree or 180 degrees in advance. That is, the phase of the pilot signals in the LTFs has the same characteristics as those in mapping of signals in BPSK modulation. In the LTFs, the phase pattern of the pilot signals is multiplexed such that correlation is not caused between the 1 MHz formats and the 2 MHz formats.

The SIG (or the SIG-A) is different between the transmission formats. As illustrated in FIG. 3, in the 1 MHz format (also holds true for the 1 MHz duplicate format), BPSK modulation is performed on all the six symbols. On the other hand, in the 2 MHz short format, QBPSK modulation is performed on both the two symbols. The QBPSK modulation is a scheme by which the phase of a constellation point is changed to 90 or 270 degrees, that is, the QBPSK modulation is a modulation scheme for obtaining a phase different from the phase obtained by BPSK modulation by 90 degrees. In addition, in the 2 MHz long format, QBPSK modulation is performed on the first one of the two symbols, and BPSK modulation is performed on the second one of the two symbols.

Example of Interfering Wave Assumed in Each Embodiment of Present Disclosure

Figure 4:
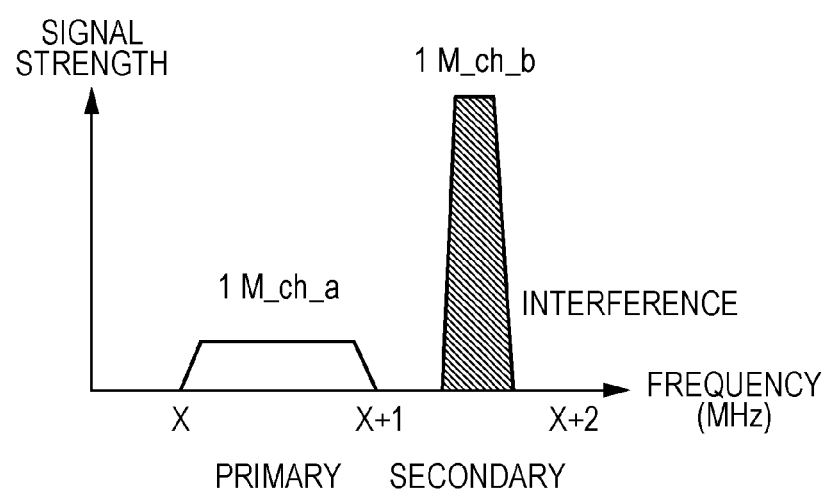
FIG. 4 is a diagram illustrating a case in which a secondary channel includes an interfering wave.

FIG. 4 illustrates an example of an interfering wave assumed in each embodiment of the present disclosure. As described above, in 802.11ah, it is assumed that a distance between an access point and a radio terminal STA of a long-range BSS is relatively large. Therefore, if a signal from an apparatus that is located sufficiently close to the radio terminal STA compared to the access point acts as a source of an interfering wave, the signal strength of the signal that acts as an interfering wave at the radio terminal STA is considerably higher than the signal strength of a signal (desired signal) from the access point as illustrated in FIG. 4.

First Embodiment

Figure 5:
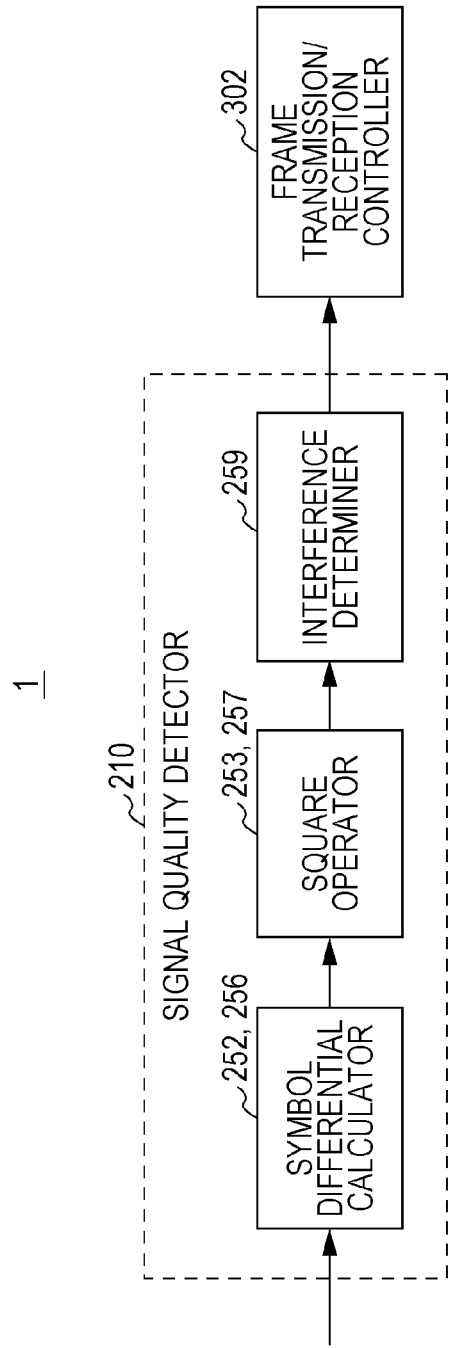
FIG. 5 is a block diagram illustrating the configuration of key components of a radio communication apparatus according to a first embodiment of the present disclosure.

FIG. 5 is a block diagram illustrating the configuration of key components of a radio communication apparatus 1 according to a first embodiment. In the radio communication apparatus 1 illustrated in FIG. 5, a signal quality detector 210 detects an interfering wave using a plurality of symbols including a symbol (LTS) configuring a preamble of a received signal and a symbol (SIG) configuring a control signal field. The received signal includes a preamble (LTF) on which pilot signals are multiplexed and a control signal field (SIG) in which a control signal modulated by a modulation scheme (BPSK or QBPSK modulation) using the same phase as or a phase in quadrature with that in which the pilot signals have been mapped is arranged and has one of a plurality of transmission formats that use a first frequency band or a second frequency band. If an interfering wave is detected, a frame transmission/reception controller 302 suppresses the effect of the interfering wave upon a signal. Here, in the signal quality detector 210, symbol differential calculators 252 and 256 calculate, in each of the first frequency band and the second frequency band, differences between a certain number of symbols adjacent to one another at predetermined positions in the time domain among the plurality of symbols. Square operators 253 and 257 perform square operations on results of the calculation of differences, and an interference determiner 259 determines whether each of the first frequency band and the second frequency band includes an interfering wave on the basis of results of the square operations.

Configuration of Radio Communication Apparatus 1

Figure 6:
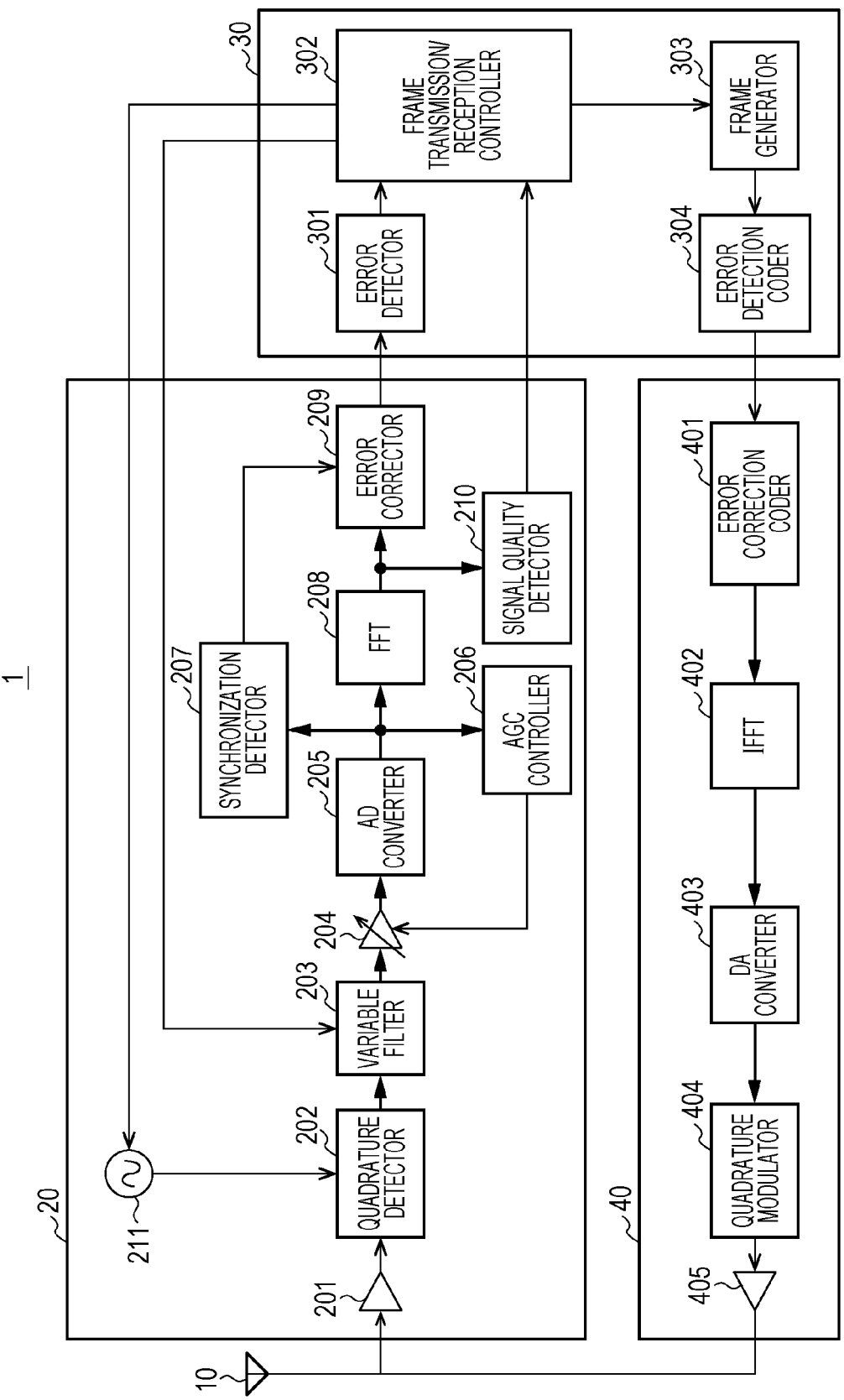
FIG. 6 is a block diagram illustrating the configuration of the radio communication apparatus according to the first embodiment of the present disclosure.

FIG. 6 is a block diagram illustrating the configuration of the radio communication apparatus 1 according to this embodiment. The radio communication apparatus 1 is, for example, the radio terminal $STA_L$ of the long-distance BSS illustrated in FIG. 1. That is, the radio communication apparatus 1 is a radio apparatus operable with a communication bandwidth of 1 MHz or 2 MHz.

In FIG. 6, thin arrows indicate transmission of an actual signal, and thick arrows indicate transmission of an IQ signal.

The radio communication apparatus 1 illustrated in FIG. 6 includes an antenna 10 that transmits and receives a signal in a radio frequency (RF) band, a reception processor 20 that extracts a packet from the RF signal in a physical layer, a media access control (MAC) processor 30 that performs processing on the packet in a MAC layer, and a transmission processor 40 that generates an RF signal from the packet input in the physical layer.

Configuration of Reception Processor 20

The reception processor 20 receives an RF signal through the antenna 10, performs reception processing on the basis of a control signal from the MAC processor 30, and outputs an obtained packet and received signal quality information (a result of signal quality detection) to the MAC processor 30.

The signal received by the reception processor 20 includes, for example, a signal (OFDM signal) for which one of the plurality of transmission formats illustrated in FIG. 3 is used. That is, the signal received by the reception processor 20 includes a preamble (LTF) on which pilot signals are multiplexed and a control signal (SIG) on which a signal modulated by a modulation scheme (BPSK or QBPSK) using the same phase as or a phase in quadrature with that in which the pilot signals have been mapped is multiplexed.

The reception processor 20 includes an amplifier 201, a quadrature detector 202, a variable filter 203, an AGC amplifier 204, an analog-to-digital (AD) converter 205, an AGC controller 206, a synchronization detector 207, a fast Fourier transform (FFT) 208, an error corrector 209, the signal quality detector 210, and a local oscillator 211.

The amplifier 201 receives an RF signal through the antenna 10, amplifies the RF signal to a certain level, and outputs the amplified signal to the quadrature detector 202.

The quadrature detector 202 performs quadrature detection on the signal received from the amplifier 201 on the basis of a frequency (local oscillation frequency) of the local oscillator 211 and outputs the obtained signal to the variable filter 203 as an IQ baseband signal (an analog signal or a complex baseband signal).

The variable filter 203 removes (suppresses) components of the IQ baseband signal received from the quadrature detector 202 outside a set passband and outputs a signal obtained as a result of the removal to the AGC amplifier 204. The variable filter 203 changes the passband thereof on the basis of a control signal from the MAC processor 30 (the frame transmission/reception controller 302), which will be described later.

The AGC amplifier 204 adjusts the gain of the IQ baseband signal received from the variable filter 203 such that an input level to the AD converter 205 becomes constant, and outputs the adjusted signal to the AD converter 205.

The AD converter 205 converts the IQ baseband signal (analog signal) received from the AGC amplifier 204 into a digital signal and outputs the IQ baseband signal having digital values to the AGC controller 206, the synchronization detector 207, and the FFT 208.

The AGC controller 206 calculates average power using the IQ baseband signal received from the AD converter 205 and controls the AGC amplifier 204 such that a difference between the calculated average power and reference power becomes small.

The synchronization detector 207 performs pattern matching between the IQ baseband signal received from the AD converter 205 and, for example, an STF in a transmission format of 802.11ah to detect a top of a frame packet (for example, refer to FIG. 3). In addition, the synchronization detector 207 controls an FFT window of the FFT 208 for each symbol.

The FFT 208 performs an FFT process on the basis of the FFT window specified by the synchronization detector 207 to convert the IQ baseband signal in the time domain received from the AD converter 205 into an IQ baseband signal in the frequency domain in units of symbols. The FFT 208 outputs the signal subjected to the Fourier transform to the error corrector 209 and the signal quality detector 210. If a transmission format of 802.11ah is received, modulated signals or pilot signals multiplexed on subcarriers can be easily analyzed because the IQ baseband signal in the frequency domain matches the carrier spacing of the subcarriers. The IQ baseband signal in the frequency domain serves as subcarrier data in units of symbols.

The error corrector 209 performs an error correction process on the IQ baseband signal received from the FFT 208 to obtain a frame packet. The error corrector 209 performs, for example, Viterbi decoding as an equalization process and the error correction process for the IQ baseband signal using a channel estimation value obtained on the basis of the pilot signals transmitted using the LTF. The error corrector 209 outputs the obtained frame packet to the MAC processor 30 (the scene selection screen 301).

The signal quality detector 210 detects signal quality using the IQ baseband signal received from the FFT 208. More specifically, the signal quality detector 210 detects an interfering wave from the IQ baseband signal using a plurality of symbols including a symbol (LTS) configuring the LTF and a symbol configuring the SIG. More specifically, the signal quality detector 210 calculates, in each band, differences between a certain number of symbols adjacent to one another at predetermined positions in a time domain among the plurality of symbols. The signal quality detector 210 then performs square operations on results of the calculation of differences and determines whether each band includes an interfering wave on the basis of results of the square operations. The signal quality detector 210 outputs a result of the determination to the MAC processor 30 (the frame transmission/reception controller 302) as received signal quality information. Details of a method for detecting signal quality used by the signal quality detector 210 will be described later.

The local oscillator 211 changes the set local oscillation frequency thereof on the basis of a control signal from the MAC processor 30 (the frame transmission/reception controller 302), which will be described later. For example, in order to perform quadrature detection on the signal having a bandwidth of 2 MHz illustrated in FIG. 2B to obtain an IQ baseband signal with which X+1 [MHz] is 0 [MHz], the local oscillation frequency is set to X+1 [MHz].

Configuration of MAC Processor 30

The MAC processor 30 outputs a control signal for controlling the variable filter 203 or the local oscillator 211 of the reception processor 20 to the reception processor 20 on the basis of a frame packet and received signal quality information received from the reception processor 20. The MAC processor 30 determines a request issued to an access point or a terminal apparatus with which the radio communication apparatus 1 is communicating on the basis of the frame packet and the received signal quality information, and then generates a frame on which control information indicating the request is multiplexed and outputs the frame to the transmission processor 40.

The MAC processor 30 includes an error detector 301, a frame transmission/reception controller 302, a frame generator 303, and an error detection encoder 304.

The error detector 301 performs an error detection process on a frame packet (that is, a packet signal subjected to error detection coding in a communication partner) received from the reception processor 20 to determine whether the frame packet is erroneous. The error detector 301 outputs frame error information indicating a result of the error detection process to the frame transmission/reception controller 302.

The frame transmission/reception controller 302 controls the variable filter 203 or the local oscillator 211 on the basis of the frame error information received from the error detector 301 or the received signal quality information received from the reception processor 20 (the signal quality detector 210). For example, if there are a frame error and an interfering wave, the frame transmission/reception controller 302 determines that the cause of the frame error is the interfering wave and controls the variable filter 203 or the local oscillator 211 in such a way as to suppress the interfering wave.

If there is no frame error but a channel set for the radio communication apparatus 1 includes an interfering wave, the frame transmission/reception controller 302 suppresses the effect of the interfering wave.

For example, if there is an interfering wave in the secondary channel, the frame transmission/reception controller 302 controls the variable filter 203 or the local oscillator 211 in such a way as to suppress the interfering wave.

If it is determined that there is an interfering wave while a communication bandwidth of 2 MHz is being used, the frame transmission/reception controller 302 generates a request signal for requesting a terminal apparatus with which the radio communication apparatus 1 is communicating to perform communication using a communication bandwidth of 1 MHz and outputs the request signal to the frame generator 303.

If the primary channel includes an interfering wave, the frame transmission/reception controller 302 generates a request signal for requesting an access point to change the primary channel and outputs the request signal to the frame generator 303.

Details of a control method for suppressing the effect of an interfering wave used by the frame transmission/reception controller 302 will be described later.

The frame generator 303 multiplexes the request signal received from the frame transmission/reception controller 302 on a frame packet.

The error detection encoder 304 performs block coding on the frame packet received from the frame generator 303 to add a redundant portion to the frame packet, so that a transmission destination can perform error detection. The error detection encoder 304 outputs the coded frame packet to the transmission processor 40 (an error correction encoder 401).

Configuration of Transmission Processor 40

The transmission processor 40 performs transmission processing on a frame packet received from the MAC processor 30 and transmits an obtained RF signal in a desired channel through the antenna 10.

The transmission processor 40 includes the error correction encoder 401, an inverse fast Fourier transform (IFFT) 402, a digital-to-analog (DA) converter 403, a quadrature modulator 404, and an amplifier 405.

The error correction encoder 401 performs, for example, convolutional coding on the frame packet received from the MAC processor 30, so that a transmission destination can perform error correction. Furthermore, the error correction encoder 401 performs time-division multiplexing on a preamble signal in accordance with a frame format and outputs an obtained signal to the IFFT 402 as an IQ baseband signal in the frequency domain.

The IFFT 402 performs an IFFT process on the IQ baseband signal in the frequency domain received from the error correction encoder 401 to convert the IQ baseband signal in the frequency domain into an IQ baseband signal in the time domain in units of symbols.

The DA converter 403 converts the IQ baseband signal (digital signal) received from the IFFT 402 into an analog signal and outputs the IQ baseband signal that has been converted into the analog signal to the quadrature modulator 404.

The quadrature modulator 404 generates an RF signal by performing quadrature modulation and frequency conversion on the IQ baseband signal received from the DA converter 403 such that the same channel as a reception channel is achieved.

The amplifier 405 amplifies the RF signal received from the quadrature modulator 404 to a certain output level and radiates the RF signal into the air through the antenna 10.

Operation of Signal Quality Detector 210

Next, details of a method for detecting signal quality used by the signal quality detector 210 of the radio communication apparatus 1 illustrated in FIG. 6 will be described.

FIG. 7 is a block diagram illustrating the internal configuration of the signal quality detector 210.

The signal quality detector 210 illustrated in FIG. 7 includes a lower interference detector 251, an upper interference detector, and the interference determiner 259.

The lower interference detector 251 detects an interfering wave relating to a channel (hereinafter referred to as a lower channel) of a lower 1 MHz band in the 2 MHz band used by the radio communication apparatus 1.

On the other hand, the upper interference detector 255 detects an interfering wave relating to a channel (hereinafter referred to as an upper channel) of a higher 1 MHz band in the 2 MHz band used by the radio communication apparatus 1.

The lower interference detector 251 includes the symbol difference calculator 252, the square operator 253, and an accumulator 254. The upper interference detector 255 includes the symbol difference calculator 256, the square operator 257, and an accumulator 258.

The symbol differential calculators 252 and 256 calculate differences between symbols in the LTF or the SIG. The symbol differential calculator 252 extracts subcarriers lower than the center of the 2 MHz communication band and calculates differences between symbols for each of the extracted subcarriers. On the other hand, the symbol differential calculator 256 extracts subcarriers higher than the center of the 2 MHz communication band and calculates differences between symbols for each of the extracted subcarriers.

The symbols between which the symbol differential calculators 252 and 256 calculate differences remain the same regardless of the transmission format used for a signal received by the radio communication apparatus 1. For example, the symbol differential calculators 252 and 256 calculate differences between symbols in the LTF or the SIG a certain distance away (for example, two to four symbols) from a position at which a packet has been detected (the top of the packet; a top of the LTF (LTF 1) illustrated in FIG. 3). That is, the symbol differential calculators 252 and 256 calculate, in the lower channel and the upper channel, respectively, differences between a certain number of symbols adjacent to one another in the time domain at predetermined positions among a plurality of symbols in the LTF or the SIG.

For example, assume that the subcarrier number of a subcarrier on which a pilot signal or data is multiplexed is denoted by k and the subcarrier number at the center of the 2 MHz communication band is denoted by k=0. In addition, the symbol number counted from the top of a packet is denoted by N. In this case, calculation of a difference between a symbol number N and a symbol number N−1 can be expressed as $Y^*(k, N-1)Y(k, N)$. Here, Y denotes a signal of the subcarrier number K and the symbol number N, and the asterisk denotes a complex conjugate.

The square operators 253 and 257 perform square operations on results of the calculation performed by the symbol differential calculators 252 and 256, respectively, for the subcarriers. For example, the square operation of a result of the calculation of a difference between the symbol number N and the symbol number N−1 can be expressed as $(Y^*(k, N-1)Y(k, N))^2$.

The accumulators 254 and 258 accumulate (vector addition) results of the calculation performed by the square operators 253 and 257, respectively, for the subcarriers. For example, if a result of the accumulation for the lower channel is denoted by XLower(diff), XLower(diff) can be expressed as $\Sigma(Y^*(k, N-1)Y(k, N))^2$ (accumulation with k<0). In addition, if a result of the accumulation for the upper channel is denoted by XUpper(diff), XUpper(diff) can be expressed as $\Sigma(Y^*(k, N-1)Y(k, N))^2$ (accumulation with k>0). Here, however, diff denotes an index added to each of the obtained results of the calculation of differences between symbols. For example, if differences between three symbols (for example, N=2, 3, 4) are calculated, diff=1, 2. XLower(1) and XUpper(1) correspond to the calculation of a difference between symbols of N=2, 3, and XLower(2) and XUpper(2) correspond to the calculation of a difference between symbols of N=3, 4.

The interference determiner 259 determines whether each of the lower channel and the upper channel includes an interfering wave on the basis of results of the calculation performed by the lower interference detector 251 and the upper interference detector 255.

Method for Detecting Interfering Wave

FIGS. 8A to 8D are diagrams illustrating the principle of a method for detecting an interfering wave used by the signal quality detector 210.

Figure 8A:
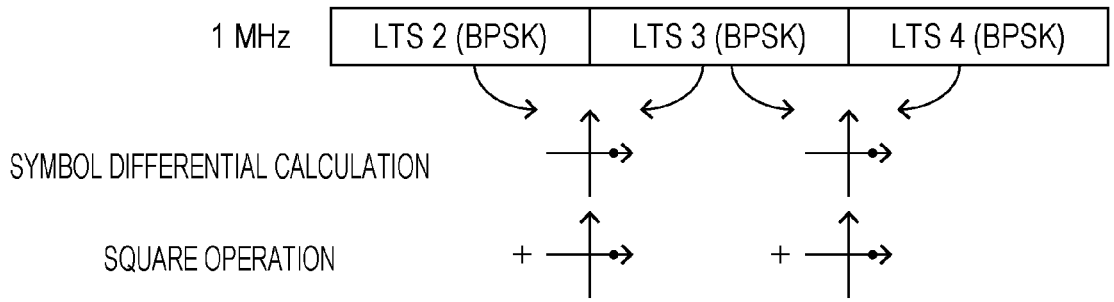
FIGS. 8A to 8C are diagrams illustrating a process for detecting interference according to the first embodiment of the present disclosure.
Figure 8B:
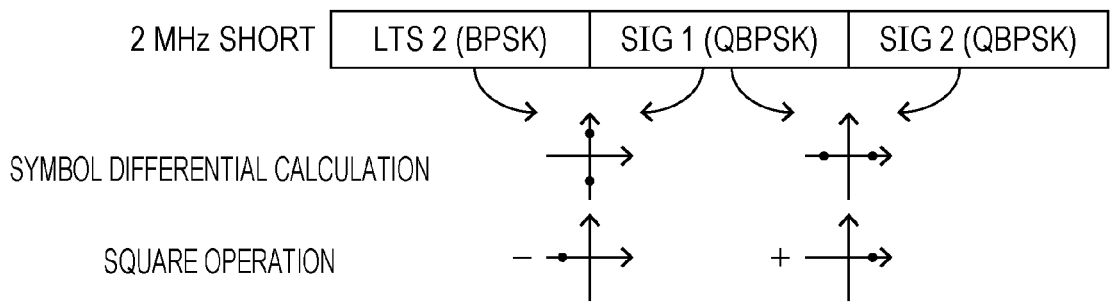
Figure 8C:
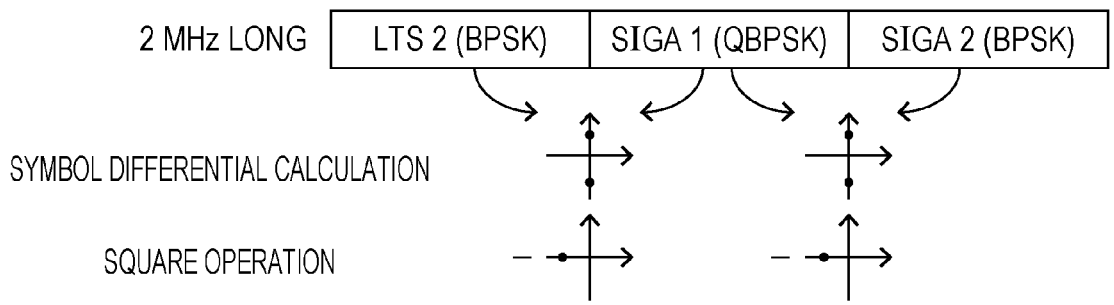
Figure 8D:
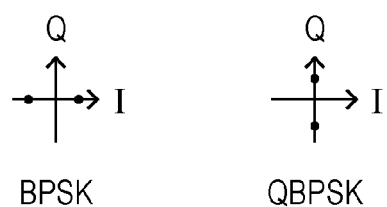
FIG. 8D is a diagram illustrating mapping of a signal using BPSK and quadrature BPSK (QBPSK).

As illustrated in FIG. 8D, a signal is mapped along an I axis in BPSK and a Q axis in QBPSK. As described above, the modulation scheme used in the SIG (or the SIG-A) is BPSK or QBPSK. Mapping of a pilot signal in each LTS included in the LTF (LTF 1) is the same as mapping in BPSK.

In the following description, the symbol differential calculators 252 and 256 extract second, third, and fourth symbols (N=2, 3, 4) from the top of a packet (packet detection position) in each of the transmission formats of the 802.11ah scheme (refer to FIG. 3) and calculate differences between symbols.

That is, in the case of the 1 MHz format (also holds true for the 1 MHz duplicate format), three symbols of the LTF 1, namely LTSs 2 to 4, are extracted. As described above, pilot signals having a phase of 0 degree or 180 degrees (the same as in BPSK modulation) and a certain value of amplitude, which are predetermined for each subcarrier, are multiplexed on the LTSs 2 to 4. Therefore, there is no phase difference between symbols having an arbitrary subcarrier number. As a result, as illustrated in FIG. 8A, results of the calculation of a difference between symbols of the LTS 2 and the LTS 3 and a difference between symbols of the LTS 3 and LTS 4 are invariably signals on the I axis.

In the case of the 2 MHz short format, the LTS 2 in the LTF 1 and the SIGs 1 and 2 in the SIG are extracted as illustrated in FIG. 8B. As described above, whereas a pilot signal having a phase of 0 degree or 180 degrees and a certain value of amplitude, which are predetermined for each subcarrier, is multiplexed on the LTS 2, data subjected to phase modulation at 90 or 270 degrees is multiplexed on the SIGs 1 and 2. Therefore, there is a phase difference of 90 or 270 degrees between the symbols of the LTS 2 and the SIG 1 having an arbitrary subcarrier number. In addition, a phase difference between the symbols of the SIG 1 and the SIG 2 having an arbitrary subcarrier number is 0 degree or 180 degrees. As a result, as illustrated in FIG. 8B, a result of the calculation of a difference between the symbols of the LTS 2 and the SIG 1 is a signal along the Q axis, and a result of the calculation of a difference between the symbols of the SIG 1 and the SIG 2 is a signal on the I axis.

Similarly, in the case of the 2 MHz long format, the LTS 2 in the LTF and the SIGAs 1 and 2 in the SIG-A are extracted as illustrated in FIG. 8C. As described above, a pilot signal having a phase of 0 degree or 180 degrees and a certain value of amplitude, which are predetermined for each subcarrier, is multiplexed on the LTS 2. In addition, data subjected to phase modulation at 90 or 270 degrees is multiplexed on the SIGA 1, and data subjected to phase modulation at 0 degree or 180 degrees is multiplexed on the SIGA 2. As a result, there is a phase difference of 90 or 270 degrees between symbols having an arbitrary subcarrier number. As a result, as illustrated in FIG. 8C, results of the calculation of a difference between the symbols of the LTS 2 and the SIGA 1 and a difference between the symbols of the SIGA 1 and the SIGA 2 are invariably signals on the Q axis.

That is, as illustrated in FIGS. 8A to 8C, a result (phase difference) of the calculation of a difference between symbols at a mapping position of a signal in BPSK modulation or QBPSK modulation is any of the following four phases: 0 degree, 90 degrees, 180 degrees, and 270 degrees.

Next, the square operators 253 and 257 perform a square operation on each result of the calculation of a difference between symbols.

In the case of the 1 MHz format, as illustrated in FIG. 8A, a result of the square operation is a positive signal on the I axis.

In the case of the 2 MHz short format, as illustrated in FIG. 8B, a result of the square operation between the symbols of the LTS 2 and the SIG 1 is a negative signal on the I axis, and a result of the square operation between the symbols of the SIG 1 and the SIG 2 is a positive signal on the I axis.

In the case of the 2 MHz long format, as illustrated in FIG. 8C, results of the square operation are negative signals on the I axis.

That is, as illustrated in FIGS. 8A to 8C, a result of the square operation performed on a result of the calculation of a difference between symbols having any of the four phases, namely 0 degree, 90 degrees, 180 degrees, and 270 degrees, is invariably a signal (vector) on the I axis.

Thus, the second, third, and fourth symbols (N=2, 3, 4) from the top of a packet can be classified into one of the two types of signals: a symbol of the LTF on which a pilot signal is mapped in the same phase as that in BPSK or a symbol of the SIG modulated by a modulation scheme using the same phase as or a phase in quadrature with that in which the pilot signals in the LTF have been mapped. Therefore, the differential calculation and the square operation between these symbols are differential calculation and a square operation between symbols modulated by BPSK or QBPSK, and a result of the differential calculation and the square operation invariably appears on the I axis.

That is, among signals received by the radio communication apparatus 1, a result of the differential calculation and the square operation between symbols relating to a signal (desired wave) transmitted from an access point of a BSS to which the radio communication apparatus 1 belongs invariably appears on the I axis. In other words, a result of the differential calculation and the square operation between symbols relating to a desired wave transmitted to the radio communication apparatus 1 can be expressed by an I axis component.

On the other hand, a scheme service (interfering wave) different from that adopted by the radio communication apparatus 1 does not necessarily have the above-described mapping relationship between the LTF and the SIG. Therefore, a result of the differential calculation and the square operation between symbols relating to an interfering wave around the radio communication apparatus 1 can appear in a region other than on the I axis. In other words, a result of the differential calculation and the square operation between symbols relating to an interfering wave around the radio communication apparatus 1 can include a Q axis component.

Therefore, the signal quality detector 210 detects the I axis component as a desired wave component and the Q axis component as an interfering wave component (the amount of interference) among results of the differential calculation and the square operation between symbols. That is, the lower interference detector 251 and the upper interference detector 255 distinguish a desired wave and an interfering wave on the basis of the I axis component and the Q axis component by performing the differential calculation and the square operation between symbols in symbol periods corresponding to the LTF and the SIG.

In addition, the lower interference detector 251 and the upper interference detector 255 perform the operation illustrated in FIGS. 8A to 8C for each subcarrier and accumulate obtained results of the square operations performed on all the subcarriers. In doing so, presence or absence of a desired wave and an interfering wave identified for each subcarrier can be averaged, and the desired wave and the interfering wave can be accurately distinguished from each other on the basis of the I axis component and the Q axis component.

The interference determiner 259 determines whether each of the bands (the lower channel and the upper channel) includes an interfering wave on the basis of results of the operations received from the lower interference detector 251 and the upper interference detector 255.

More specifically, the interference determiner 259 performs the following process for each band.

In the following description, "X(diff)" (that is, X=XLower(diff) or XUpper(diff)) is used as a value indicating both a result XLower of the operation received from the lower interference detector 251 and a result XUpper of the operation received from the upper interference detector 255.

In addition, in the following description, a case in which three symbols are extracted (a case in which a difference between symbols is calculated twice) will be described. That is, diff=1, 2.

First, the interference determiner 259 calculates a desired wave level index $P_C$ indicating the signal level of a desired wave and an interfering wave level index $P_I$ indicating the signal level of an interfering wave using the result X(diff) of the operation.

[Math. 1]

$$\text{Desired wave level index } P_C = |Re\ X(1)| + |Re\ X(2)| \quad (1)$$

[Math. 2]

$$\text{Interfering wave level index } P_I = |Im\ X(1)| + |Im\ X(2)| \quad (2)$$

Here, |Re X| denotes a real part (I axis component) of X (complex number), and |Im X| denotes an imaginary part (Q axis component) of X.

Next, the interference determiner 259 compares the calculated $P_C$ and $P_I$ with a certain threshold value to determine whether there is an interfering wave. For example, the interference determiner 259 defines a ratio (interference ratio) of a desired wave to an interfering wave as $P_I/P_C$. If $P_I/P_C$ is equal to or larger than a first threshold value ($P_I/P_C \geq$ first threshold value) and $P_I$ is equal to or larger than a second threshold value ($P_I \geq$ second threshold value), the interference determiner 259 determines that there is an interfering wave. In other cases ($P_I/P_C <$ first threshold value or $P_I <$ second threshold value), the interference determiner 259 determines that there is no interfering wave. That is, if the ratio of $P_I$, which indicates the interfering wave component, to $P_C$, which indicates the desired wave component, is equal to or larger than the first threshold value and $P_C$ is equal to or larger than the second threshold value, the interference determiner 259 determines that there is an interfering wave that affects the communication performed by the radio communication apparatus 1.

By performing the above-described process for the bands (channels), the interference determiner 259 determines whether each of the upper channel and the lower channel includes an interfering wave.

Thus, in this embodiment, the radio communication apparatus 1 performs the differential calculation and the square operations between symbols of a received signal to distinguish a desired wave and an interfering wave on the basis of the I axis component and the Q axis component. Therefore, in this embodiment, the amount of interference can be calculated more accurately than, for example, in a method for calculating the amount of interference on the basis of reception power as in Japanese Patent No. 4413934. Therefore, according to this embodiment, unnecessary switching of the channel due to erroneous detection of an interfering wave can be avoided, thereby preventing a decrease in throughput characteristics.

Furthermore, since an interfering wave is detected by distinguishing a desired wave and an interfering wave on the basis of the I axis component and the Q axis component in this embodiment, interference can be accurately detected even if a difference in signal strength between the desired wave and the interfering wave becomes large under weak field conditions specified by TGah (802.11ah), in which a large maximum transmission distance, namely 1 km, is assumed.

In addition, according to this embodiment, an interfering wave is detected using a certain number of symbols (two to four symbols from the top of the LTF in FIG. 8) at predetermined positions. Therefore, a method for detecting interference regardless of the transmission format can be realized.

As described above, according to this embodiment, an interfering wave can be accurately detected regardless of the transmission format.

Operations Performed by Radio Communication Apparatus 1 for Detecting Interfering Wave Next, operations performed by the radio communication apparatus 1 for detecting an interfering wave will be described in detail.

First Operation Example

FIGS. 9 and 10A to 10D

Figure 9:
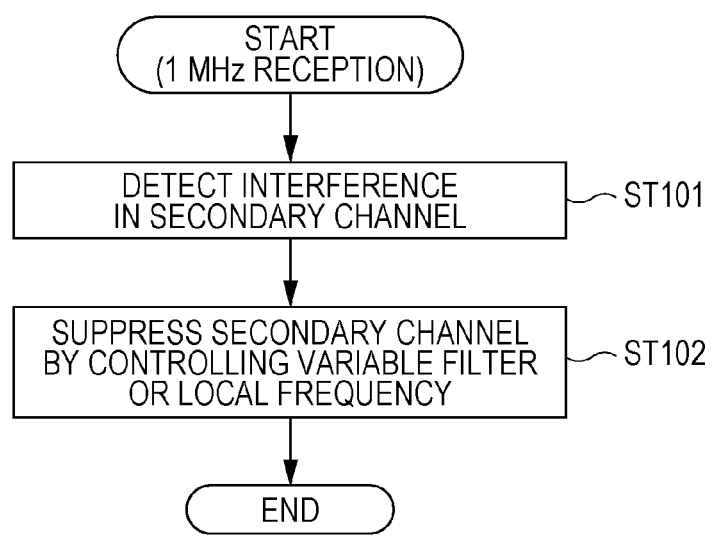
FIG. 9 is a flowchart illustrating a process for suppressing an interfering wave according to the first embodiment of the present disclosure (first operation example).

In a first operation example, a case in which an interfering wave is detected in the secondary channel when the 1 MHz format is used will be described. FIG. 9 is a flowchart illustrating the procedure of a process performed by the radio communication apparatus 1 in the first operation example.

Figure 10B:
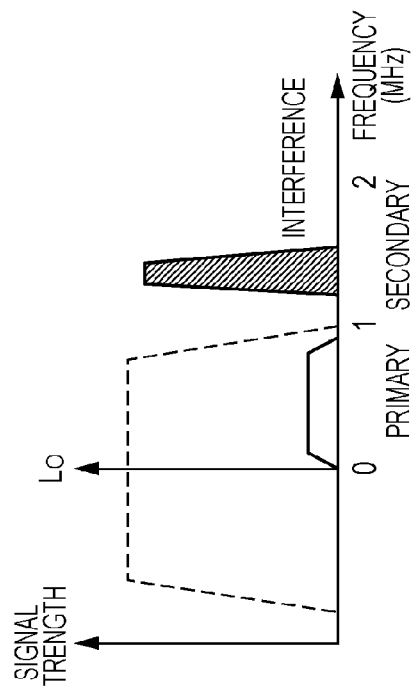
FIGS. 10B to 10D are diagrams illustrating waveforms of the IQ baseband signal at the variable filter after the interfering wave is detected in the first operation example of the first embodiment of the present disclosure.
Figure 10D:
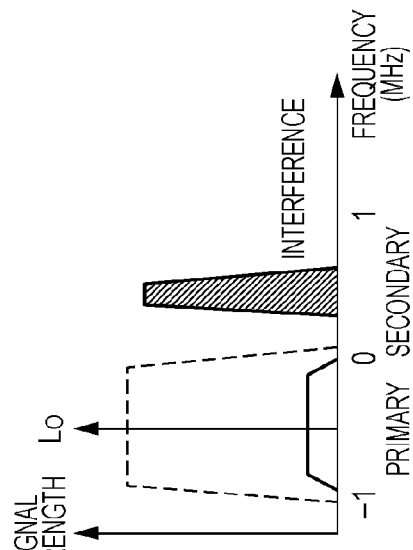
Figure 10A:
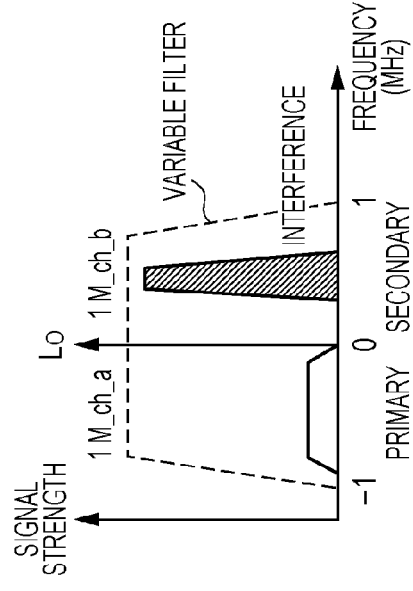
FIG. 10A is a diagram illustrating a waveform of an in-phase/quadrature (IQ) baseband signal at a variable filter before an interfering wave is detected in the first operation example of the first embodiment of the present disclosure.
Figure 10C:
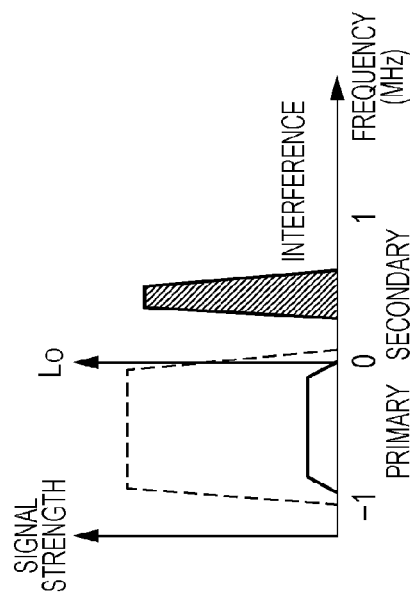

FIG. 10A is a diagram illustrating a waveform of an IQ baseband signal at the variable filter 203 before the interfering wave is detected (before the frame transmission/reception controller 302 is controlled). FIGS. 10B to 10D are diagrams illustrating waveforms of the IQ baseband signal at the variable filter 203 after an interfering wave is detected. In FIGS. 10A to 10D, the horizontal axis represents frequency, and the vertical axis represents signal strength. In FIGS. 10A to 10D, broken lines indicate the passbands of the variable filter 203.

In the radio communication apparatus 1, the signal quality detector 210 detects an interfering wave in the secondary channel illustrated in FIG. 10A (step (hereinafter referred to as "ST") 101 illustrated in FIG. 9).

If an interfering wave is detected in the secondary channel, the frame transmission/reception controller 302 instructs the variable filter 203 to change filtering and/or the local oscillator 211 to change the local oscillation frequency Lo (ST102). That is, if an interfering wave is detected in the secondary channel when the 1 MHz format is used, the frame transmission/reception controller 302 controls the local oscillation frequency Lo or the passband of the variable filter 203 to suppress the interfering wave.

As illustrated in FIG. 10A, before an interfering wave is detected, the local oscillator 211 determines the center of the 2 MHz frequency band as the local oscillation frequency Lo (0 [MHz]), and the variable filter 203 is a symmetrical filter having a 2 MHz passband whose center is the local oscillation frequency Lo.

On the other hand, if an interfering wave is detected in the secondary channel, for example, the frame transmission/reception controller 302 may instruct the local oscillator 211 to change the local oscillation frequency Lo without controlling the variable filter 203 as illustrated in FIG. 10B. In FIG. 10B, the local oscillation frequency Lo (0 [MHz]) is changed from the frequency (the center of the 2 MHz frequency band) illustrated in FIG. 10A to a lowest frequency of a signal in the primary channel. As a result, the signal passes through the primary channel, and the interfering wave in the secondary channel is suppressed. That is, the frame transmission/reception controller 302 changes the local oscillation frequency Lo such that the secondary channel does not fall within the passband of the variable filter 203. According to the operation illustrated in FIG. 10B, it is necessary that the radio communication apparatus 1 change the local oscillation frequency Lo. Because one filter is needed, the interfering wave can be suppressed without increasing the scale of the circuit.

Alternatively, as illustrated in FIG. 10C, the frame transmission/reception controller 302 may instruct the variable filter 203 to perform narrow-band filtering without controlling the local oscillator 211. For example, in FIG. 10C, the variable filter 203 is switched from the symmetrical filter having the 2 MHz passband around the local oscillation frequency Lo (0 [MHz]) to an asymmetrical complex filter having a 1 MHz passband. As a result, the signal passes through the primary channel, and the interfering wave in the secondary channel is suppressed. That is, the frame transmission/reception controller 302 controls the variable filter 203 such that the primary channel falls within the passband of the variable filter 203. According to the operation illustrated in FIG. 10C, because the frequency position of the primary channel does not change before and after the control of the frame transmission/reception controller 302, control for suppressing the interfering wave can be performed even if the radio communication apparatus 1 is receiving data. Furthermore, even if there is an interfering wave at frequencies lower than those of the primary channel as well as the interfering wave in the secondary channel (higher frequencies than those of the primary channel) illustrated in FIG. 10C, the interfering waves can be suppressed.

Alternatively, as illustrated in FIG. 10D, the frame transmission/reception controller 302 may instruct the local oscillator 211 to change the local oscillation frequency Lo and the variable filter 203 to perform narrow-band filtering. In FIG. 10D, the local oscillation frequency Lo (0 [MHz]) is changed from the frequency (the center of the 2 MHz frequency band) illustrated in FIG. 10A to the center frequency of the primary channel. In addition, the variable filter 203 is switched from the symmetrical filter having the 2 MHz passband around the local oscillation frequency Lo (0 [MHz]) to a symmetrical real filter having a 1 MHz passband. As a result, the signal passes through the primary channel, and the interfering wave in the secondary channel is suppressed. That is, the frame transmission/reception controller 302 changes the local oscillation frequency Lo such that the secondary channel does not fall within the passband of the variable filter 203 and controls the variable filter 203 such that the primary channel falls within the passband of the variable filter 203. According to the operation illustrated in FIG. 10D, the variable filter 203 can be configured more easily using the symmetrical real filter. In addition, not only the interfering wave in the secondary channel (higher frequencies than those of the primary channel) illustrated in FIG. 10D but also an interfering wave at frequencies lower than those of the primary channel can be suppressed.

As described above, the frame transmission/reception controller 302 controls the variable filter 203 or the local oscillator 211 such that the interfering wave in the secondary channel does not fall within the passband of the variable filter 203, and accordingly the interfering wave in the secondary channel can be suppressed. Thus, since the AGC amplifier 204 causes the level of the signal for which the interfering wave has been suppressed to be constant and then the signal is input to the AD converter 205, deterioration of reception characteristics for the desired wave that would otherwise be caused by quantization noise of the AD converter 205 due to the interfering wave can be suppressed.

Second Operation Example

FIGS. 11A to 11C

In a second operation example, a case in which an interfering wave is detected in the secondary channel when the 2 MHz format (short or long) is used will be described. FIG. 11A is a flowchart illustrating the procedure of a process performed by the radio communication apparatus 1 in the second operation example. In FIG. 11A, the same step of processing as that illustrated in FIG. 9 is given the same reference numeral, and accordingly description thereof is omitted.

If an interfering wave is detected in the secondary channel (ST101), the frame transmission/reception controller 302 outputs, to the frame generator 303, a control signal for requesting a source (not illustrated), with which the radio communication apparatus 1 is communicating, to transmit a signal using the 1 MHz transmission format (ST201). The frame generator 303 multiplexes the control signal indicating the request on a frame packet. As a result, the request is subjected to certain transmission processing and transmitted to the source through the antenna 10.

The frame transmission/reception controller 302 controls the variable filter 203 and the local oscillator 211 in order to receive the signal using the 1 MHz format (ST202). As a result, the transmission format of the signal received by the radio communication apparatus 1 is changed from a 2 MHz format illustrated in FIG. 11B to a 1 MHz format illustrated in FIG. 11C. That is, the signal received by the radio communication apparatus 1 is changed from a signal having a bandwidth of 2 MHz including the primary channel and the secondary channel illustrated in FIG. 11B to a signal having a bandwidth of 1 MHz including the primary channel illustrated in FIG. 11C.

That is, if an interfering wave is detected in the secondary channel when the 2 MHz format is used, the frame transmission/reception controller 302 requests a communication partner of the radio communication apparatus 1 to perform communication using the lower channel (primary channel). As a result, a desired wave included in the primary channel and an interfering wave in the secondary channel do not overlap, thereby reducing the effect of the interfering wave upon the desired wave.

Alternatively, as in the first operation example (refer to FIGS. 10B to 10D), the frame transmission/reception controller 302 may suppress the interfering wave in the secondary channel using the variable filter 203 or the local oscillator 211. In doing so, the effect of the interfering wave upon the desired wave can be further reduced.

Third Operation Example FIGS. 12A to 12C

In a third operation example, a case in which an interfering wave is detected in the primary channel when the 1 MHz format is used will be described. FIG. 12A is a flowchart illustrating the procedure of a process performed by the radio communication apparatus 1 in the third operation example.

FIG. 12B illustrates a case in which, for example, when an access point that establishes a new BSS determines the primary channel, it is not detected as a result of scanning performed by the access point that a service provided by another system is using a certain channel, and, when an existing BSS according to 802.11ah is not using the certain channel, the certain channel is assigned as the primary channel for the new BSS. That is, in FIG. 12B, a case will be described in which a signal used in the service provided by another system causes cochannel interference with a radio terminal STA (the radio communication apparatus 1) of the new BSS in 1 MHz format reception.

The signal quality detector 210 detects an interfering wave in the primary channel illustrated in FIG. 12B (ST301).

If an interfering wave is detected in the primary channel, the frame transmission/reception controller 302 outputs, to the frame generator 303, a control signal for requesting the access point to change (move) the primary channel (ST302). The frame generator 303 multiplexes the control signal indicating the request on a frame packet. As a result, the request is subjected to certain transmission processing and transmitted to the access point through the antenna 10.

The access point to which the request is transmitted is, as described above, an access point that cannot detect an interfering wave in the primary channel. Upon receiving the request to change the primary channel from the radio communication apparatus 1, the access point notifies, after it is confirmed between access points that the change of the primary channel poses no problem, all terminal apparatuses of the change of the primary channel. The radio communication apparatus 1 receives the notification of the change of the primary channel from the access point (ST303).

The frame transmission/reception controller 302 controls the variable filter 203 and the local oscillator 211 in order to receive a signal using the new primary channel (ST304). As a result, the primary channel through which the radio communication apparatus 1 receives the signal is changed from one ranging over frequencies X to X+1 [MHz] illustrated in FIG. 12B to one ranging over frequencies X+1 to X+2 [MHz] illustrated in FIG. 12C. In FIGS. 12B and 12C, the primary channel and the secondary channel change positions before and after the change. That is, the signal received by the radio communication apparatus 1 is changed from a signal in a band including the interfering wave illustrated in FIG. 12B to a signal in a band that does not include the interfering wave illustrated in FIG. 12C.

That is, if an interfering wave is detected in the primary channel when the 1 MHz format is used, the frame transmission/reception controller 302 requests the access point that manages the communication of the radio communication apparatus 1 to change the frequency band to which the primary channel is assigned (here, a change from the lower channel to the upper channel).

As a result, even if the access point cannot detect interference in the primary channel and the interference is cochannel interference with the radio terminal (the radio communication apparatus 1) in the BSS, communication is possible. That is, as illustrated in FIG. 12C, since the desired wave and the interfering wave do not overlap, the effect of the interfering wave upon the desired wave can be reduced.

Alternatively, as in the first operation example (FIGS. 10B to 10D), the interfering wave in the secondary channel may be suppressed using the variable filter 203 or the local oscillator 211. In doing so, the effect of the interfering wave upon the desired wave can be further reduced. In FIG. 12C, if the signal level of the interfering wave is so low that the interfering wave does not affect the primary channel as adjacent channel interference, the suppression of the secondary channel (ST304) described in the first operation example may be omitted.

Fourth Operation Example

FIGS. 13A to 13C

In a fourth operation example, a case in which an interfering wave is detected in the primary channel when the 2 MHz format (short or long) is used will be described. FIG. 13A is a flowchart illustrating the procedure of a process performed by the radio communication apparatus 1 in the fourth operation example. In FIG. 13A, the same steps of processing as those illustrated in FIGS. 9 and 12A are given the same reference numerals, and accordingly description thereof is omitted.

If an interfering wave is detected in the primary channel (ST301), the frame transmission/reception controller 302 outputs, to the frame generator 303, a control signal for requesting an access point to change (move) the primary channel (ST302). Upon receiving the request to change the primary channel from the radio communication apparatus 1, the access point notifies, after it is confirmed between access points that the change of the primary channel poses no problem, all terminal apparatuses of the change of the primary channel. The radio communication apparatus 1 receives the notification of the change of the primary channel from the access point (ST303).

The frame transmission/reception controller 302 outputs, to the frame generator 303, a control signal for requesting a source (not illustrated), with which the radio communication apparatus 1 is communicating, to transmit a signal using the 1 MHz format (ST201).

The frame transmission/reception controller 302 then controls the variable filter 203 and the local oscillator 211 in order to receive the signal using the new primary channel and transmission format (ST401). As a result, the transmission format of the signal received by the radio communication apparatus 1 is changed from a 2 MHz transmission format illustrated in FIG. 13B to a 1 MHz transmission format illustrated in FIG. 13C. Furthermore, the primary channel through which the radio communication apparatus 1 receives the signal is changed from one ranging over frequencies X to X+1 [MHz] illustrated in FIG. 13B to one ranging over frequencies X+1 to X+2 [MHz] illustrated in FIG. 13C. That is, the signal received by the radio communication apparatus 1 is changed from a signal including a band in which the interfering wave is included illustrated in FIG. 13B to a signal in a band that does not include the interfering wave illustrated in FIG. 13C.

That is, if an interfering wave is detected in the primary channel when the 2 MHz format is used, the frame transmission/reception controller 302 requests the access point that manages the communication of the radio communication apparatus 1 to change the frequency band to which the primary channel is assigned and a communication partner of the radio communication apparatus 1 to perform communication using the primary channel.

As a result, even if the access point cannot detect interference in the primary channel and the interference is cochannel interference with a radio terminal (the radio communication apparatus 1) in the BSS, communication is possible. That is, as illustrated in FIG. 13C, since the desired wave included in the primary channel and the interfering wave in the secondary channel do not overlap, the effect of the interfering wave upon the desired wave can be reduced.

Alternatively, as in the first operation example (ST102 illustrated in FIG. 9), the interfering wave in the secondary channel may be suppressed using the variable filter 203 and the local oscillator 211. In doing so, the effect of the interfering wave upon the desired wave can be further reduced. In FIG. 13C, if the signal level of the interfering wave is so low that the interfering wave does not affect the primary channel as adjacent channel interference, the suppress of the secondary channel (ST102) described in the first operation example may be omitted.

The operations performed by the radio communication apparatus 1 after an interfering wave is detected have been described above.

Whereas the range of a BSS according to an existing wireless LAN standard is 10 to 20 m in diameter, a maximum transmission distance of 1 km is prepared in TGah (802.11ah). Therefore, in 802.11ah, if adjacent channel interference occurs, the effect of the interference might be considerably larger than in a BSS according to the existing wireless LAN standard. In this case, reception characteristics might significantly deteriorate. For example, if the reception field strength of a desired wave in the primary channel at a radio terminal STA is low because the desired wave is transmitted away from the radio terminal STA and if the reception field strength of an interfering wave in the secondary channel at the radio terminal STA is high because the interfering wave is transmitted near the radio terminal STA, the level ratio of the desired wave to the interfering wave might be considerably higher than in the existing wireless LAN standard.

In this case, the interfering wave in the secondary channel whose reception field strength is higher than that of the desired wave might occupy the dynamic range of an AD converter provided at a previous stage of digital signal processing in the radio terminal STA. Therefore, it might be difficult to remove the effect of the interfering wave in the secondary channel by switching the communication to communication using the primary channel as disclosed in Japanese Patent No. 4413934. More specifically, if the interfering wave in the secondary channel occupies the dynamic range of the AD converter, a significant amount of quantization noise of the AD converter is superimposed upon the desired wave in the primary channel, thereby deteriorating the reception characteristics.

On the other hand, in this embodiment, if an interfering wave is detected in the secondary channel when the 1 MHz format is used, the radio communication apparatus 1 controls the variable filter 203 and the local oscillator 211 to suppress the effect of the interfering wave upon a desired wave. That is, as illustrated in FIG. 6, the AD converter 205 of the radio communication apparatus 1 receives a signal obtained after the interfering wave is suppressed. Therefore, it is possible to prevent the interfering wave in the secondary channel from occupying the dynamic range of the AD converter 205 provided in a previous stage of digital signal processing in the receiver.

In addition, as illustrated in FIG. 1, an interfering wave (for example, refer to FIGS. 12B and 13B) in the primary channel of a reception terminal (STA) caused by a terminal (a hidden terminal to an AP) that cannot be detected by the AP might decrease throughput. For example, in U.S. Patent Application Publication No. 2013/0107830, if the maximum transmission distance is large, an apparatus in another system might be a hidden terminal to an AP. In this case, a signal of the other system is not detected by channel scanning performed by the AP, and, if there is a channel available to an existing BSS, the AP undesirably determines the channel as the primary channel of a reception terminal even if the channel includes the signal of the other system. At this time, for example, if the AP is far from the radio terminal STA and a service provided by the other system is close to the radio terminal STA, the reception field strength of the signal used in the service provided by the other system at the radio terminal STA is considerably higher than that of a signal from the AP. Therefore, the radio terminal STA receives the signal in the primary channel as cochannel interference, thereby decreasing throughput.

On the other hand, in this embodiment, if an interfering wave is detected in the primary channel, the radio communication apparatus 1 requests an access point to change a frequency band in which the primary channel is set. In addition, if the 2 MHz format is used, the radio communication apparatus 1 further requests a communication partner to use the 1 MHz band. Therefore, even if the access point cannot detect a signal used in a different scheme service and the same channel as that including the signal of the difference scheme service is set for the radio communication apparatus 1, the effect of the interfering wave can be reduced. As a result, according to this embodiment, a decrease in throughput caused by cochannel interference can be prevented.

Second Embodiment

In a second embodiment, the operation of a signal quality detector 210a of the radio communication apparatus 1 is different from that of the signal quality detector 210 according to the first embodiment (FIG. 6).

Figure 14:
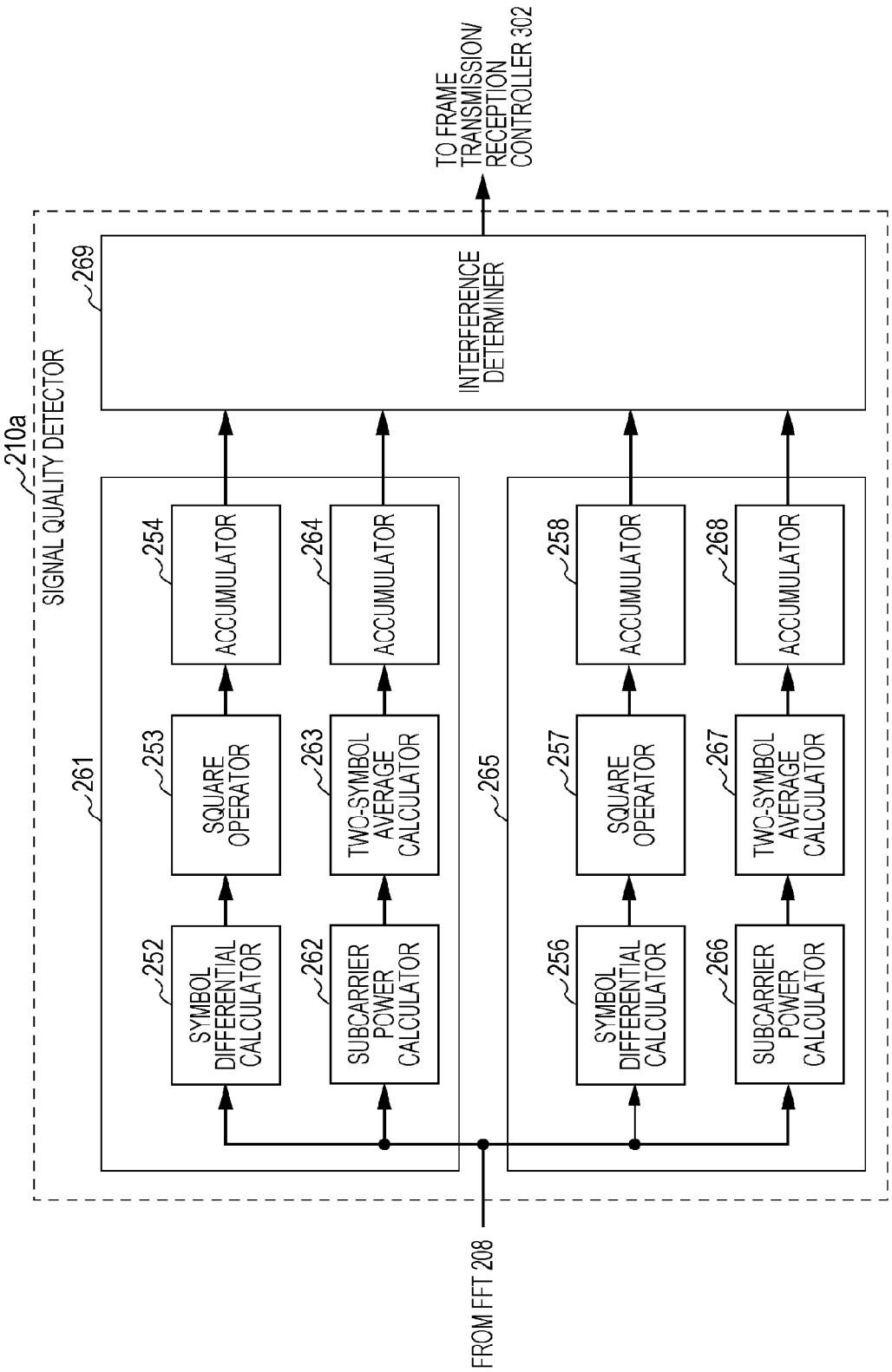
FIG. 14 is a block diagram illustrating the internal configuration of a signal quality detector according to a second embodiment of the present disclosure.

FIG. 14 is a block diagram illustrating the internal configuration of the signal quality detector 210a according to this embodiment. In FIG. 14, components that perform the same operations as those performed by the components illustrated in FIG. 7 are given the same reference numerals, and accordingly description thereof is omitted.

In the signal quality detector 210a illustrated in FIG. 14, a lower interference detector 261 includes a subcarrier power calculator 262, a two-symbol average calculator 263, and an accumulator 264 as well as the symbol differential calculator 252, the square operator 253, and the accumulator 254. In addition, an upper interference detector 265 includes a subcarrier power calculator 266, a two-symbol average calculator 267, and an accumulator 268 as well as the symbol differential calculator 256, the square operator 257, and the accumulator 258.

The subcarrier power calculators 262 and 266 calculate the power of each subcarrier.

The two-symbol average calculators 263 and 267 calculate an average of two symbols for the power of each subcarrier calculated by the subcarrier power calculators 262 and 266, respectively.

The accumulators 264 and 268 calculate the total power of the subcarriers in the lower channel and the upper channel by accumulating results of the calculation performed by the two-symbol average calculator 263 and 267, respectively.

An interference determiner 269 determines whether each of the lower channel and the upper channel includes an interfering wave on the basis of results of calculation (squares of results of calculation of differences between symbols) received from the accumulator 254 and 258 and the results of the calculation (the total power of the subcarriers) received from the accumulators 264 and 268. More specifically, the interference determiner 269 determines which of the lower channel and the upper channel has a larger amount of interference and how much the amount of interference is different between the lower channel and the upper channel, in order to determine that the channel with a larger amount of interference includes an interfering wave.

Method for Detecting Interfering Wave

Next, details of a method for detecting an interfering wave used by the signal quality detector 210a according to this embodiment will be described.

In the following description, a desired wave level index (refer to Expression (1)) and an interfering wave level index (refer to Expression (2)) obtained from results of the calculation output from the accumulator 254 of the lower interference detector 261 are denoted by $P_{CLow}$ and $P_{ILow}$, respectively.

In addition, a desired wave level index and an interfering wave level index obtained from results of the calculation output from the accumulator 258 of the upper interference detector 265 are denoted by $P_{CUp}$ and $P_{IUp}$, respectively.

In addition, the total power of the subcarriers output from the accumulator 264 of the lower interference detector 261 is denoted by $P_{AllLow}$, and the total power of the subcarriers output from the accumulator 268 of the upper interference detector 265 is denoted by $P_{AllUp}$.

As described in the first embodiment, the desired wave level indices $P_{CLow}$ and $P_{CUp}$ are the squares of differences between symbols. Here, since the square operations are performed in the symbol differential calculation, the square of differences between symbols is equivalent to the fourth power of the signal strength of the symbols (that is, the square of the power of the symbols). Therefore, in order to match dimensions, $\sqrt{P_{CLow}}$ and $\sqrt{P_{CUp}}$, which are the square roots of $P_{CLow}$ and $P_{CUp}$, are regarded as the power of desired waves.

The total power of the subcarriers in each channel (the lower channel and the upper channel) is a value obtained by adding thermal noise power, desired wave power, and interfering wave power. Here, the power (thermal noise power) of thermal noise included in a received signal is denoted by $P_n$. Because it is assumed that the thermal noise power does not depend on the channel, $P_n$ can be regarded as substantially the same between the lower channel and the upper channel.

That is, in the lower channel, the total power $P_{AllLow}$ of the subcarriers=the thermal noise power $P_n$+the desired wave power $\sqrt{P_{CLow}}$+the interfering wave power $P_{ILow}$. In the upper channel, the total power $P_{AllUp}$ of the subcarriers=the thermal noise power $P_n$+the desired wave power $\sqrt{P_{CUp}}$+the interfering wave power $P_{IUp}$.

Therefore, the interference determiner 269 calculates the value of (the total power of the subcarriers−the desired wave power), that is, the value of (the thermal noise power+the interfering wave power), as an interfering wave in each channel. That is, the interference determiner 269 calculates $(P_{AllLow}-\sqrt{P_{CLow}})$ as an interfering wave in the lower channel and $(P_{AllUp}-\sqrt{P_{CUp}})$ as an interfering wave in the upper channel.

The interference determiner 269 then calculates an interference estimation value indicated by the following Expression (3) as a determination criterion of presence or absence of an interfering wave.

[Math. 3]

$$\text{Interference estimation value} = \left(P_{AllLow} - \sqrt{P_{CLow}}\right) - \left(P_{AllUp} - \sqrt{P_{CUp}}\right) \quad (3)$$
$$= (P_n + P_{ILow}) - (P_n + P_{IUp})$$
$$= P_{ILow} - P_{IUp}$$

The interference determiner 269 then determines whether there is an interfering wave on the basis of the calculated interference estimation value. More specifically, the interference determiner 269 determines that the upper channel includes an interfering wave if the interference estimation value indicated by Expression (3) is smaller than 0 (interference estimation value<0) and the absolute value of the interference estimation value is equal to or larger than a third threshold value (|interference estimation value|≥third threshold value). On the other hand, the interference determiner 269 determines that the lower channel includes an interfering wave if the interference estimation value indicated by Expression (3) is equal to or larger than 0 (interference estimation value≥0) and the absolute value of the interference estimation value is equal to or larger than the third threshold value (|interference estimation value|≥third threshold value).

If the absolute value of the interference estimation value indicated by Expression (3) is smaller than the third threshold value (|interference estimation value|<third threshold value), the interference determiner 269 determines that there is no interference.

Thus, the interference determiner 269 determines the square root of the I axis component among the results of the square operations performed on differences between symbols as the desired wave power. In addition, the interference determiner 269 determines a value obtained by subtracting the desired wave power from the sum of results of the two-symbol average calculation of the subcarrier power (that is, the total power of the subcarriers) as the interfering wave power. If a value obtained by subtracting the interfering wave power of the lower channel (secondary channel) from the interfering wave power of the upper channel (primary channel) is smaller than 0 and the value is equal to or larger than the third threshold value, the interference determiner 269 determines that the upper channel includes an interfering wave. If the value is equal to or larger than 0 and the value is equal to or larger than the third threshold value, the interference determiner 269 determines that the lower channel includes an interfering wave.

That is, the interference determiner 269 determines whether there is an interfering wave on the basis of the power of all the subcarrier signals and the desired wave power. As indicated in Expression (3), the interference estimation value is equivalent to a difference between the values of interfering wave power ($P_{ILow}-P_{IUp}$) since the thermal noise power $P_n$ included in both the lower channel and the upper channel is offset. That is, the interference determiner 259 determines whether there is an interfering wave by identifying which of the channels has a larger amount of interference.

Thus, the signal quality detector 210a according to this embodiment determines whether there is an interfering wave by comparing the channels using the square operation values (correspond to the desired wave power) of differences between symbols and the total power of the subcarriers while taking into consideration that the thermal noise does not depend on the channel. As a result, according to this embodiment, as in the first embodiment, an interfering wave can be accurately detected regardless of the transmission format.

As indicated in Expression (3), the interference estimation value can be expressed as a difference between the values of interfering wave power ($P_{ILow}-P_{IUp}$). Therefore, the lower interference detector 261 and the upper interference detector 265 need not include the subcarrier power calculators 262 and 266, the two-symbol average calculators 263 and 267, and the accumulators 264 and 268 illustrated in FIG. 14 and may output $P_{ILow}$ and $P_{IUp}$, which are indices indicating the interfering wave power, to the interference determiner 269, instead. In this case, as in this embodiment, the interference determiner 269 can determine whether there is an interfering wave on the basis of the interference estimation value ($=P_{ILow}-P_{IUp}$).

Third Embodiment

In the first embodiment, a case in which whether there is an interfering wave is determined by performing the symbol differential calculation and the square operation has been described. On the other hand, in a third embodiment, a case will be described in which whether there is an interfering wave is determined by performing symbol differential calculation, squared absolute value operations, and symbol difference calculation.

Figure 15:
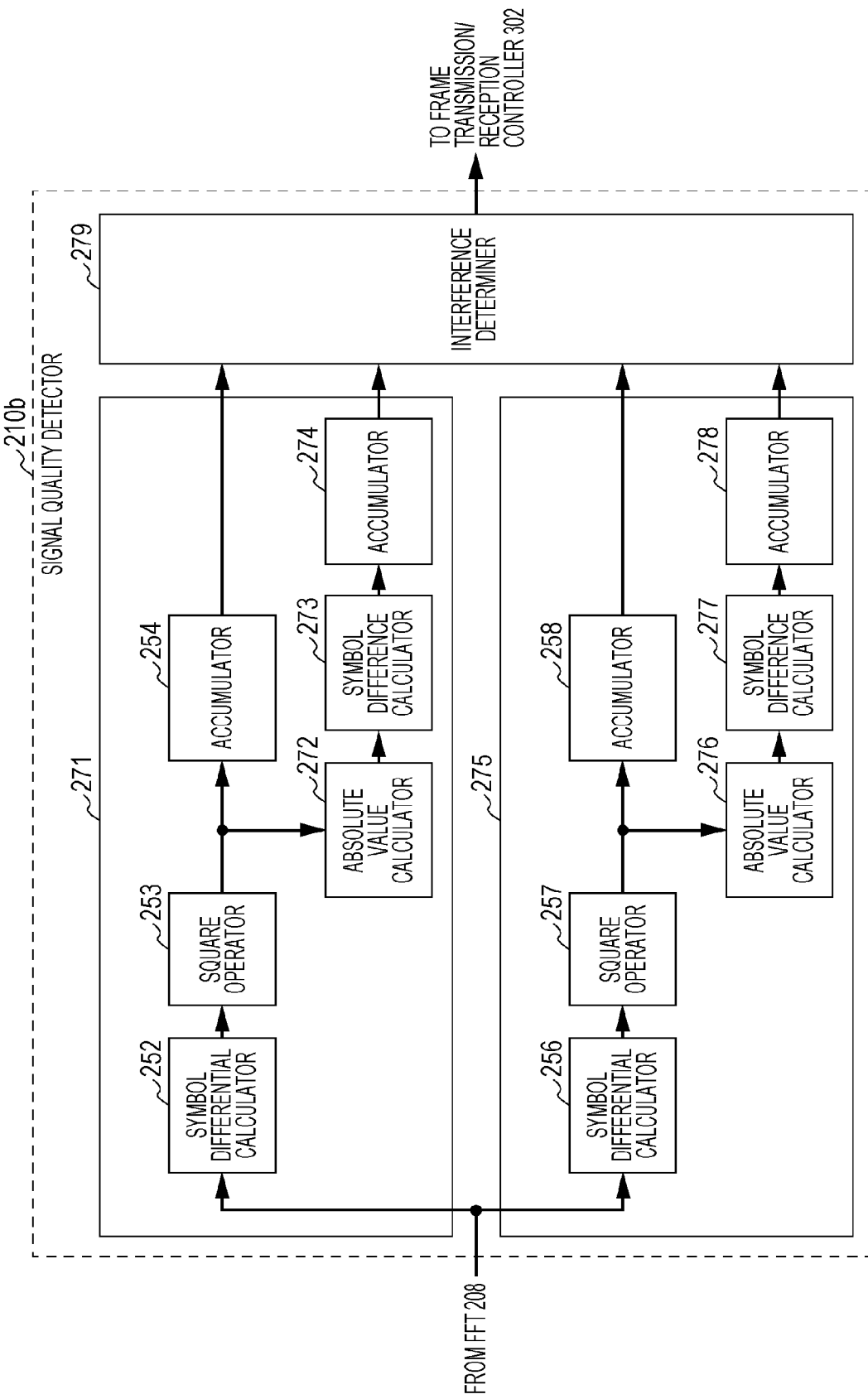
FIG. 15 is a block diagram illustrating the internal configuration of a signal quality detector according to a third embodiment of the present disclosure.

FIG. 15 is a block diagram illustrating the internal configuration of the signal quality detector 210b according to this embodiment. In FIG. 15, components that perform the same operations as those performed by the components illustrated in FIG. 7 are given the same reference numerals, and accordingly description thereof is omitted.

In the signal quality detector 210b illustrated in FIG. 15, a lower interference detector 271 includes an absolute value calculator 272, a symbol difference calculator 273, and an accumulator 274 as well as the symbol differential calculator 252, the square operator 253, the accumulator 254. An upper interference detector 275 includes an absolute value calculator 276, a symbol difference calculator 277, and an accumulator 278 as well as the symbol differential calculator 256, the square operator 257, and the accumulator 258.

In this embodiment, the symbol differential calculator 252 performs symbol differential calculation using at least three symbols. That is, at least two results of the symbol differential calculation can be obtained.

The absolute value calculators 272 and 276 calculate, for each subcarrier, absolute values of results of the square operations received from the square operators 253 and 257, respectively.

The symbol difference calculators 273 and 277 obtain, for each subcarrier, differences between absolute values received from the absolute value calculator 272 and 276, respectively, and calculate the magnitudes of the difference vectors.

The accumulators 274 and 278 accumulate results of the calculation performed by the symbol difference calculators 273 and 277, respectively, for each subcarrier.

The interference determiner 279 determines whether each of the lower channel and the upper channel includes an interfering wave on the basis of results of calculation received from the accumulators 254 and 258 and the results of the calculation received from the accumulators 274 and 278.

Method for Detecting Interfering Wave

FIG. 16 illustrates an example of a method for detecting an interfering wave used by the signal quality detector 210b.

As illustrated in FIG. 16, as in the first embodiment (FIGS. 8A to 8C), the modulation scheme used for the SIG (or the SIG-A) is BPSK or QBPSK, and the mapping of pilot signals in the LTSs included in the LTF (LTF 1) is the same as that in BPSK.

In the example illustrated in FIG. 16, as in the first embodiment, the symbol differential calculators 252 and 256 extract second, third, and fourth symbols (N=2, 3, 4) from the top of a packet (the top of the LTF (LTF 1)) in each of the transmission formats of 802.11ah (refer to FIG. 3) and calculate differences between symbols. Next, the square operators 253 and 257 perform square operations on results of the differential calculation, and the absolute value calculators 272 and 276 calculate absolute values of results of the square operations. As described in the first embodiment, signals of the results of the square operations performed on the LTF or the SIG invariably appear on the I axis.

Figure 16A:
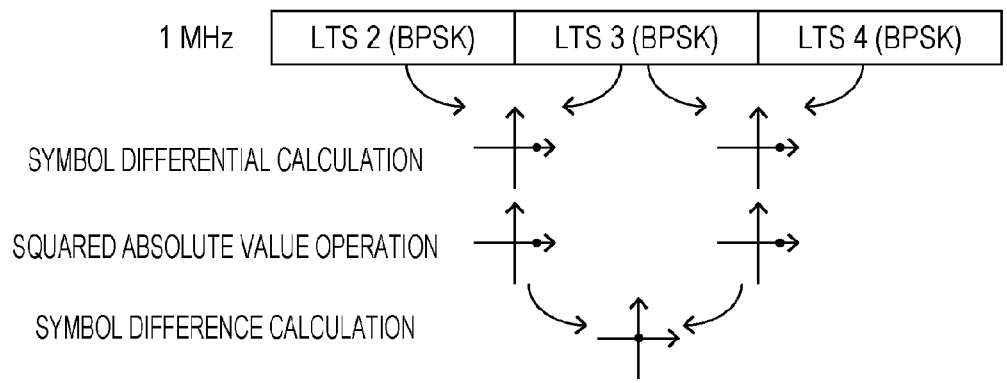
FIGS. 16A to 16C are diagrams illustrating a process for detecting interference according to a third embodiment of the present disclosure.
Figure 16B:
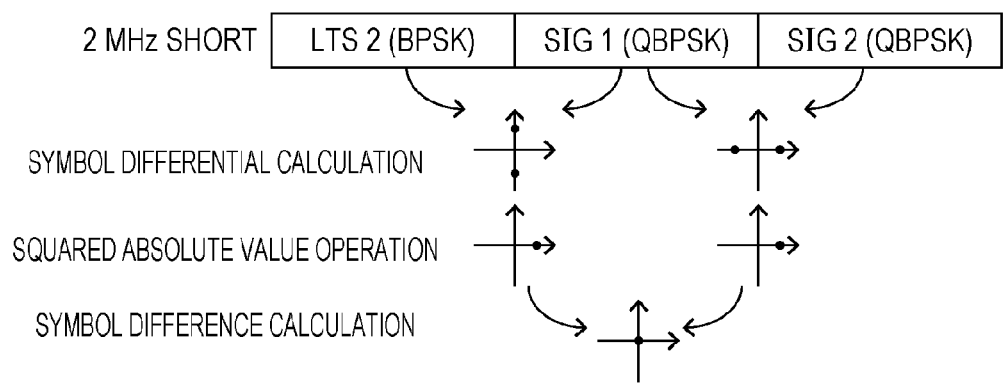
Figure 16C:
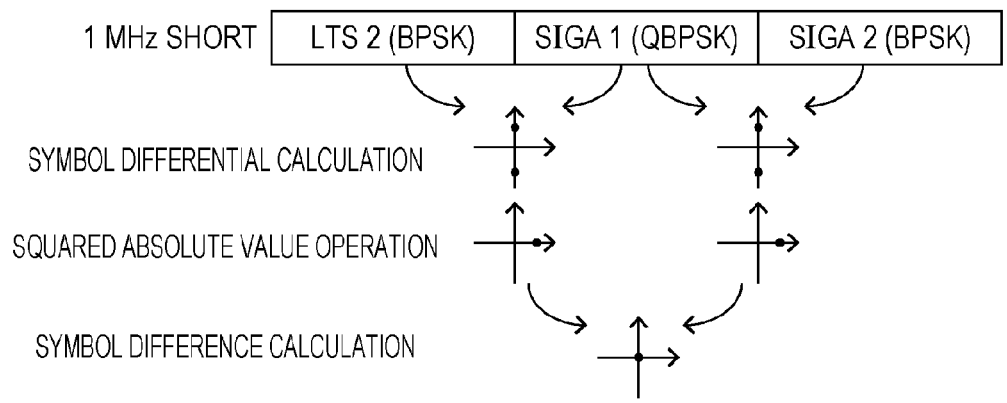

As a result, as illustrated in FIGS. 16A to 16C, results of the absolute value calculation performed by the absolute value calculators 272 and 276 are positive signals on the I axis regardless of the transmission format.

Next, the symbol difference calculators 273 and 277 obtain differences between results of the squared absolute value calculation and calculate the magnitudes of the difference vectors. As described above, the results of the squared absolute value calculation performed on the LTF or the SIG are invariably positive signals on the I axis. Therefore, as illustrated in FIGS. 16A to 16C, results of the symbol difference calculation invariably appear at the origin regardless of the transmission format.

Thus, in any transmission format, the results of the symbol difference calculation appear at the origin. In other words, if a result of the symbol difference calculation does not appear at the origin, each amplitude component along the I axis and the Q axis may be regarded as the effect of an interfering wave superimposed upon each subcarrier.

Therefore, the signal quality detector 210b uses each result of the symbol difference calculation as an interfering wave index. More specifically, the signal quality detector 210b determines the magnitude of a vector of each result of the symbol difference calculation as an interfering wave component. In addition, as in the first embodiment, the signal quality detector 210b determines an I axis component of each result of the square operation performed on differences between symbols as a desired wave component.

Thus, the lower interference detector 271 and the upper interference detector 275 use the magnitudes of vectors relative to the origin as the magnitudes of interfering waves by performing the symbol differential calculation, the square operations, the absolute value calculation, and the calculation of the magnitudes of difference vectors after obtaining differences between symbols in periods corresponding to the LTF and the SIG.

The interference determiner 279 determines which of the bands (the lower channel and the upper channel) includes an interfering wave on the basis of results of the calculation received from the lower interference detector 271 and the upper interference detector 275. More specifically, the interference determiner 279 performs the following process for each band.

In the following description, a result of the symbol difference calculation received from the lower interference detector 271 and a result of the symbol difference calculation received from the upper interference detector 275 will be referred to as interfering wave level indices $P_{I2Lower}$ and $P_{I2Upper}$, respectively.

In addition, as in the first embodiment, the desired wave level index of the lower channel and the desired wave level index of the upper channel obtained from results of the square operations performed on differences between symbols using Expression (1) will be denoted by $P_{CLower}$ and $P_{CUpper}$, respectively.

The interference determiner 279 calculates a difference $(=P_{I2Lower}-P_{I1Upper})$ between the interfering wave level index of the lower channel and the interfering wave level index of the upper channel as the interference estimation value.

Next, the interference determiner 279 determines whether there is an interfering wave using the interference estimation value and the desired wave level index $P_C$. More specifically, if the interference estimation value is smaller than 0 (interference estimation value<0) and the ratio of the absolute value of the interference estimation value to $P_{Cupper}$ is equal to or larger than a fourth threshold value (|interference estimation value|/$P_{Cupper}$≥fourth threshold value), the interference determiner 279 determines that the upper channel includes an interfering wave. On the other hand, if the interference estimation value is equal to or larger than 0

(interference estimation value≥0) and the ratio of the absolute value of the interference estimation value to $P_{CLower}$ is equal to or larger than the fourth threshold value (|interference estimation value|/$P_{CLower}$≥fourth threshold value), the interference determiner 279 determines that the lower channel includes an interfering wave.

In other cases, the interference determiner 279 determines that there is no interfering wave.

That is, if a value (interference estimation value) obtained by subtracting an interfering wave component in the upper channel from an interfering wave component in the lower channel is smaller than 0 and the ratio of the absolute value of the interference estimation value to a desired wave component in the upper channel is higher than the fourth threshold value, the interference determiner 279 determines that the upper channel includes an interfering wave. On the other hand, if the interference estimation value is equal to or larger than 0 and the ratio of the absolute value of the interference estimation value to a desired wave component in the lower channel is higher than the fourth threshold value, the interference determiner 279 determines that the lower channel includes an interfering wave.

Thus, in this embodiment, the signal quality detector 210*b* calculates an interfering wave level in a state in which the effect of a desired wave is canceled (converged at the origin of a complex plane) by calculating the squared absolute values of differences between symbols. The signal quality detector 210*b* then calculates a relative difference between the interfering wave levels of the channels by calculating a difference between the calculated interfering wave levels of the channels. The signal quality detector 210*b* can then accurately detect the effect of an interfering wave upon a desired wave by calculating the ratio of the absolute value of the relative difference to the desired wave level of the channel having a larger amount of interference.

Therefore, according to this embodiment, as in the first embodiment, an interfering wave can be accurately detected regardless of the transmission format.

The embodiments of the present disclosure have been described.

The method for detecting an interfering wave described in each of the embodiments can be applied when the phases of modulation signals are in quadrature between symbols (when the phase difference between signals is 0 degree, 90 degrees, 180 degrees, or 270 degrees). Therefore, the modulation schemes used are not limited to BPSK and QBPSK, but, for example, QPSK may be used, instead.

The components (function blocks) of the radio communication apparatus 1 used in the embodiments may be realized by large scale integration (LSI), which is an integrated circuit. At this time, each of the components may be individually realized as a chip, or some or all of the components may be realized as a chip. Although LSI is mentioned here, the components may be realized by an integrated circuit (IC), system LSI, super-LSI, or ultra-LSI depending on the degree of integration.

The method for realizing the components as an integrated circuit is not limited to LSI, but the components may be realized by a dedicated circuit or a general-purpose processor. A field-programmable gate array (FPGA) capable of writing programs after an LSI manufacturing process or a reconfigurable processor capable of reconfiguring connections and settings of circuit cells in LSI may be used, instead.

Furthermore, if a technique for realizing the components as an integrated circuit that replaces LSI appears as a result of evolution of semiconductor technologies or other derivative technologies, obviously the function blocks may be realized as an integrated circuit using such a technique. Application of biotechnology is one of possibilities.

In addition, the radio communication apparatus 1 and the radio communication method described in the embodiments may be realized using a method including at least part of the above-described processes.

In addition, at least part of the procedure of the operations of the radio communication apparatus 1 described in the embodiments may be written in a program, and, for example, a central processor (CPU) may read and execute the program stored in a memory, or the program may be saved in a recording medium and distributed.

In addition, each of the embodiments may be realized by combining any apparatus, method, circuit, and program that perform part of a process for realizing each of the embodiments. For example, part of the configuration of the radio communication apparatus 1 described in each of the embodiments may be realized by a radio communication apparatus or an integrated circuit, and the procedure of the operation performed by the rest of the configuration may be written in a program and, for example, a CPU may realize the configuration by reading and executing the program stored in a memory.

The present disclosure can be applied to a radio communication system that uses a preamble including a short preamble and is effective in suppressing deterioration of reception characteristics caused by the effect of frequency selective interference due to power leakage in an adjacent channel or the like. The components of the above-described embodiments may be combined as desired without departing from the scope of the disclosure.

What is claimed is:

1. A radio communication apparatus comprising:
   a detector that detects an interfering wave using a plurality of symbols including symbols configuring a preamble and symbols configuring a control signal field, within a received signal including the preamble on which pilot signals are multiplexed and the control signal field on which a control signal modulated by a modulation scheme that uses a same phase as or a phase in quadrature with a phase of the pilot signals is arranged, the received signal having one of a plurality of transmission formats that use at least one of a first frequency band and a second frequency band; and
   a controller that, when the interfering wave is detected, suppresses an effect of the interfering wave upon the received signal,
   wherein the detector and the controller are implemented with one or more physical computing resources, and the detector includes
   a differential calculator that calculates, in each of the first frequency band and the second frequency band, respective differences between adjacent two symbols of a certain number of symbols at predetermined positions in a time domain among the plurality of symbols,
   a square operator that performs square operations on results of the calculation of differences, and
   a determiner that determines, using results of the square operations, whether the interfering wave is detected in each of the first frequency band and the second frequency band.

2. The radio communication apparatus according to claim 1,
   wherein, the determiner determines that the interfering wave is detected if a ratio of an interfering wave component to a desired wave component is higher than a first threshold value and the interfering wave component is larger than a second threshold value, the interfering wave component being a quadrature axis component of the results of the square operations, and the desired wave component being an in-phase axis component of the results of the square operations.

3. The radio communication apparatus according to claim 1,
wherein the detector further includes
a power calculator that calculates total power of subcarriers of each of the certain number of symbols for each of the first frequency band and the second frequency band, and
a two-symbol average calculator that performs two-symbol average calculation on the calculated total power of each of the certain number of symbols,
wherein the determiner determines that the interfering wave is detected in the second frequency band if a value obtained by subtracting a second interfering wave component of the second frequency band from a first interfering wave component of the first frequency band is smaller than 0 and the value is larger than a third threshold value, the first and second interfering wave components being values obtained by subtracting a desired wave component, which is a square root of an in-phase axis component among the results of the square operations, from results of the two-symbol average calculation, and
wherein the determiner determines that the interfering wave is detected in the first frequency band if the value is equal to or larger than 0 and the value is equal to or larger than the third threshold value.

4. The radio communication apparatus according to claim 1,
wherein the certain number is at least three,
wherein the detector further includes
an absolute value calculator that obtains at least two squared absolute values by performing absolute value calculation on at least two of the results of the square operations, and
a difference calculator that calculates a difference between the at least two squared absolute values,
wherein the determiner determines that the interfering wave is detected in the second frequency band if a value obtained by subtracting a second interfering wave component in the second frequency band from a first interfering wave component in the first frequency band is smaller than 0 and an absolute value of the value relative to a desired wave component, which is an in-phase axis component among the results of the square operations, in the second frequency band is equal to or larger than a fourth threshold value, the first and the second interfering wave component being a magnitude of a vector that is a result of the differential calculation, and
wherein the determiner determines that the interfering wave is detected in the first frequency band if the value is equal to or larger than 0 and the absolute value of the value relative to a desired wave component in the first frequency band is equal to or larger than the fourth threshold value.

5. The radio communication apparatus according to claim 1,
wherein, when a second transmission format, in which the first frequency band and the second frequency band are used, is used and the detector detects the interfering wave in the second frequency band, the controller requests a communication partner of the radio communication apparatus to perform communication using the first frequency band.

6. The radio communication apparatus according to claim 1,
wherein, when a first transmission format, in which the first frequency band is used, is used and the detector detects the interfering wave in the first frequency band, the controller requests an access point that manages communication performed by the radio communication apparatus to change a frequency band to which the first frequency band is assigned.

7. The radio communication apparatus according to claim 1,
wherein, when a second transmission format, in which the first frequency band and the second frequency band are used, is used and the detector detects the interfering wave in the first frequency band, the controller requests an access point that manages communication performed by the radio communication apparatus to change a frequency band to which the first frequency band is assigned and requests a communication partner of the radio communication apparatus to perform communication using the first frequency band.

8. The radio communication apparatus according to claim 1,
wherein, when a first transmission format, in which the first frequency band is used, is used and the detector detects the interfering wave in the second frequency band, the controller controls a local oscillation frequency or a passband of a filter to suppress the interfering wave.

9. The radio communication apparatus according to claim 8,
wherein the controller changes the local oscillation frequency such that the second frequency band does not fall within the passband.

10. The radio communication apparatus according to claim 8,
wherein the controller controls the filter such that the first frequency band falls within the passband.

11. The radio communication apparatus according to claim 8,
wherein the controller adjusts the second frequency band to outside the passband by changing the local oscillation frequency, and adjusts the first frequency band to inside the passband by controlling the filter.

12. A radio communication method performed by a radio communication apparatus, the method comprising:
detecting an interfering wave using a plurality of symbols including symbols configuring a preamble and symbols configuring a control signal field, within a received signal including the preamble on which pilot signals are multiplexed and the control signal field on which a control signal modulated by a modulation scheme that uses the same phase as or a phase in quadrature with a phase of the pilot signals is arranged, the received signal having one of a plurality of transmission formats that use at least one of a first frequency band and a second frequency band; and
suppressing, when the interfering wave is detected, an effect of the interfering wave upon the received signal,
wherein the detecting step includes
calculating, in each of the first frequency band and the second frequency band, differences between a certain number of symbols adjacent to one another at predetermined positions in a time domain among the plurality of symbols,
performing square operations on results of the calculation of differences, and
determining, using results of the square operations, whether the interfering wave is detected in each of the first frequency band and the second frequency band includes the interfering wave.

* * * * *